US005662547A

United States Patent [19]

Moroto et al.

[11] Patent Number: 5,662,547

[45] Date of Patent: Sep. 2, 1997

[54] CONTINUOUSLY VARIABLE TRANSMISSION

[75] Inventors: Shuzo Moroto, Nagoya; Takao Taniguchi; Shoichi Miyagawa, both of Okazaki; Shiro Sakakibara, Anjo; Kazumasa Tsukamoto, Toyota; Takeshi Inuzuka; Masashi Hattori, both of Anjo, all of Japan

[73] Assignee: Aisin AW Co., Ltd., Japan

[21] Appl. No.: 621,503

[22] Filed: Mar. 25, 1996

[30] Foreign Application Priority Data

Mar. 24, 1995 [JP] Japan .................................... 7-066234

[51] Int. Cl.$^{6}$ .................................................. F16H 9/26

[52] U.S. Cl. .................................................................. 477/48

[58] Field of Search .............................. 475/211; 477/46, 477/48

[56] References Cited

U.S. PATENT DOCUMENTS

| | | | |
|---|---|---|---|
| 3,340,749 | 9/1967 | Magg et al. | 475/211 |
| 3,375,734 | 4/1968 | Lemons | 475/211 |
| 3,385,132 | 5/1968 | Browning | 475/211 |
| 3,479,908 | 11/1969 | Kress et al. | 475/211 |
| 4,290,320 | 9/1981 | Abbott | 74/689 |
| 4,402,237 | 9/1983 | Tomlinson | 74/689 |
| 4,553,450 | 11/1985 | Gizard | 74/689 |
| 4,644,820 | 2/1987 | Macey | 74/689 |
| 5,045,028 | 9/1991 | Rattunde et al. | 475/211 |

FOREIGN PATENT DOCUMENTS

| | | |
|---|---|---|
| 56-49456 | 5/1981 | Japan . |
| 56-52653 | 5/1981 | Japan . |
| 59-110954 | 6/1984 | Japan . |
| 6-331000 | 11/1994 | Japan . |

*Primary Examiner*—Dirk Wright
*Attorney, Agent, or Firm*—Lorusso & Loud

[57] ABSTRACT

A belt type continuously variable transmission (CVT) and a planetary gear unit are combined in a continuously variable transmission system for an automobile to deliver an output from the output shaft in the normal and reverse directions with a neutral position therebetween. A control mechanism with a hydraulic circuit controls hydraulic pressure of primary and secondary hydraulic servos for controlling axial forces applied to respective primary and secondary pulleys of the belt type continuously variable transmission. When an axial force difference is produced between the primary pulley and the secondary pulley, the belt type continuously variable transmission changes its speed corresponding to a torque transmission direction and normal and reverse rotation directions. When axial forces of the primary and secondary pulleys become equal, then the belt type continuously variable transmission self-converges so that the output shaft has zero rotation and is stably held at the neutral position without a driving starter device and without a normal and reverse rotation switching device.

15 Claims, 21 Drawing Sheets

FIG. 1(a)
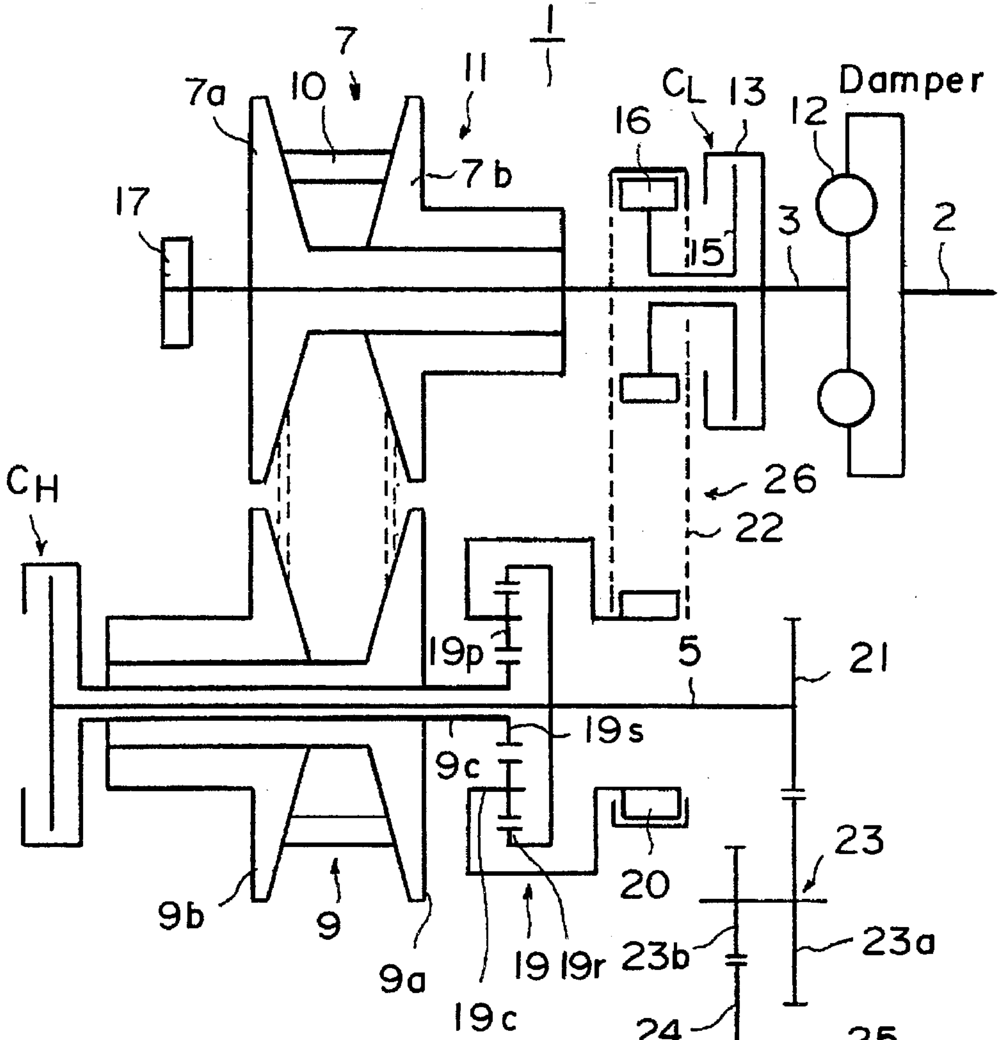
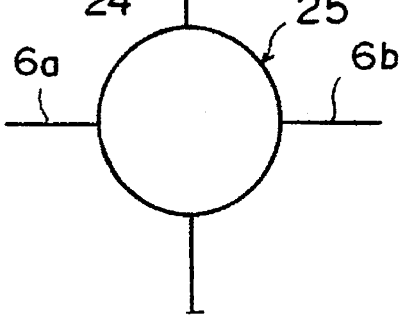
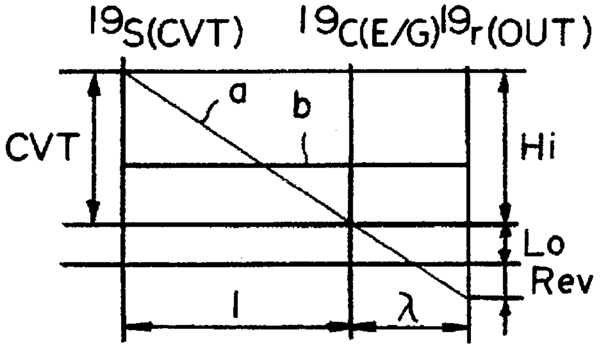
FIG. 1(b)

| Elements / Manual Position | | Primary Hydraulic Servo 32 | | Secondary Hydraulic Servo 33 | | $C_L$ | $C_H$ |
|---|---|---|---|---|---|---|---|
| | | 1st Hydraulic Chamber 45 | 2nd Hydraulic Chamber 47 | 1st Hydraulic Chamber 46 | 2nd Hydraulic Chamber 49 | | |
| P | | ○ | | ○ | | ○ | |
| R | | ○ | ○ | ○ | | | |
| N | | ○ | | ○ | | | |
| D | L | ○ | | ○ | ○ | ○ | |
| | H | ○ | ○ | ○ | | | ○ |

FIG. 5

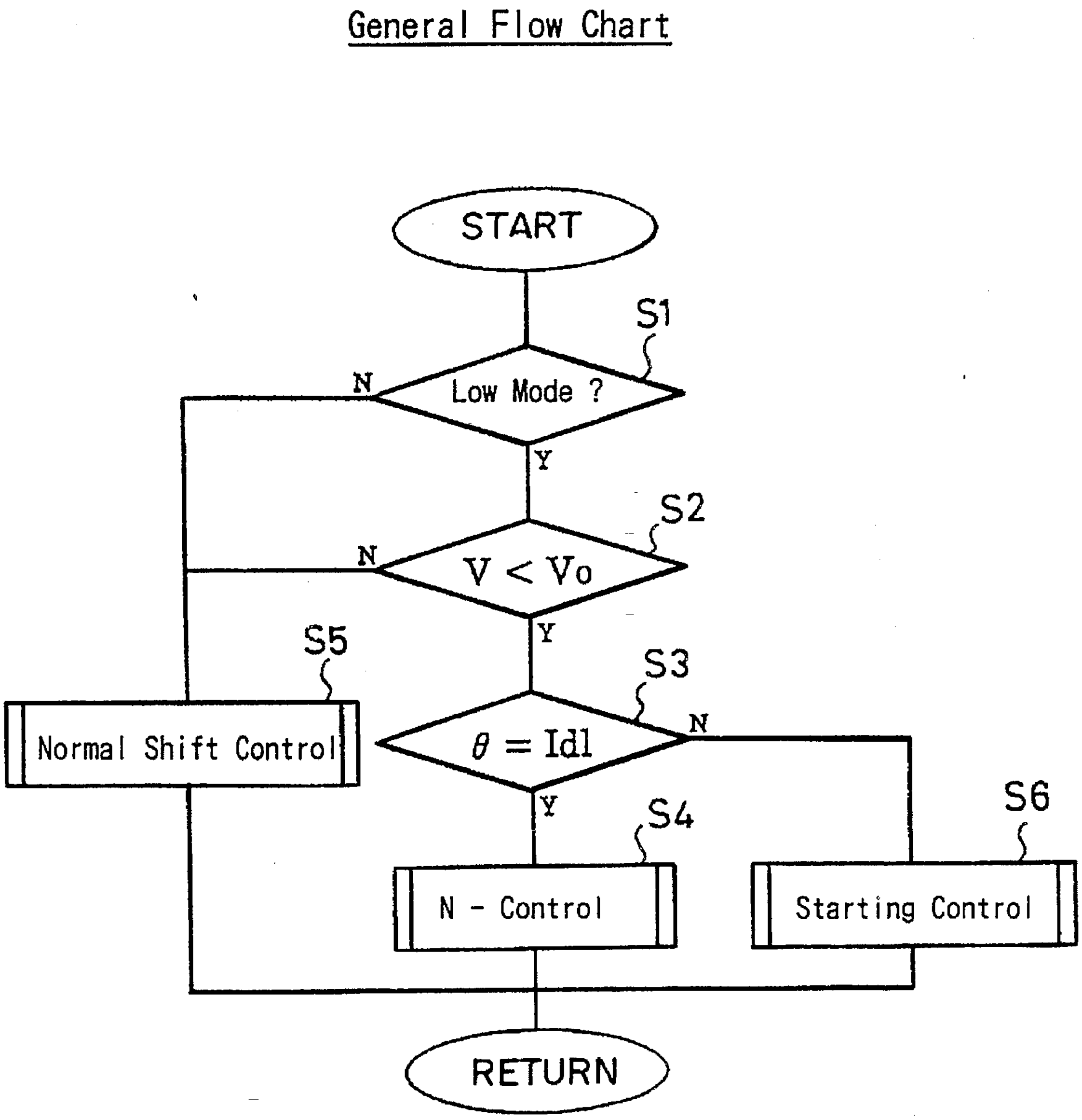
F I G. 6

N - Control Subroutine for Switching Chambers

| Elements / Manual Position | | Primary Hydraulic Servo 32 | | Secondary Hydraulic Servo 33 | | $C_L$ | $C_H$ |
|---|---|---|---|---|---|---|---|
| | | $P_L$ − L (77) | $P_L$ − H (76) | $P_L$ − L (77) | $P_L$ − H (76) | | |
| P | | ○ | | ○ | | | |
| R | | | ○ | ○ | | ○ | |
| N | | ○ | | ○ | | | |
| D | L | ○ | | | ○ | ○ | |
| | H | | ○ | ○ | | | ○ |

*FIG. 12*

N - Control Subroutine
for Double Regulators

FIG. 14(a)
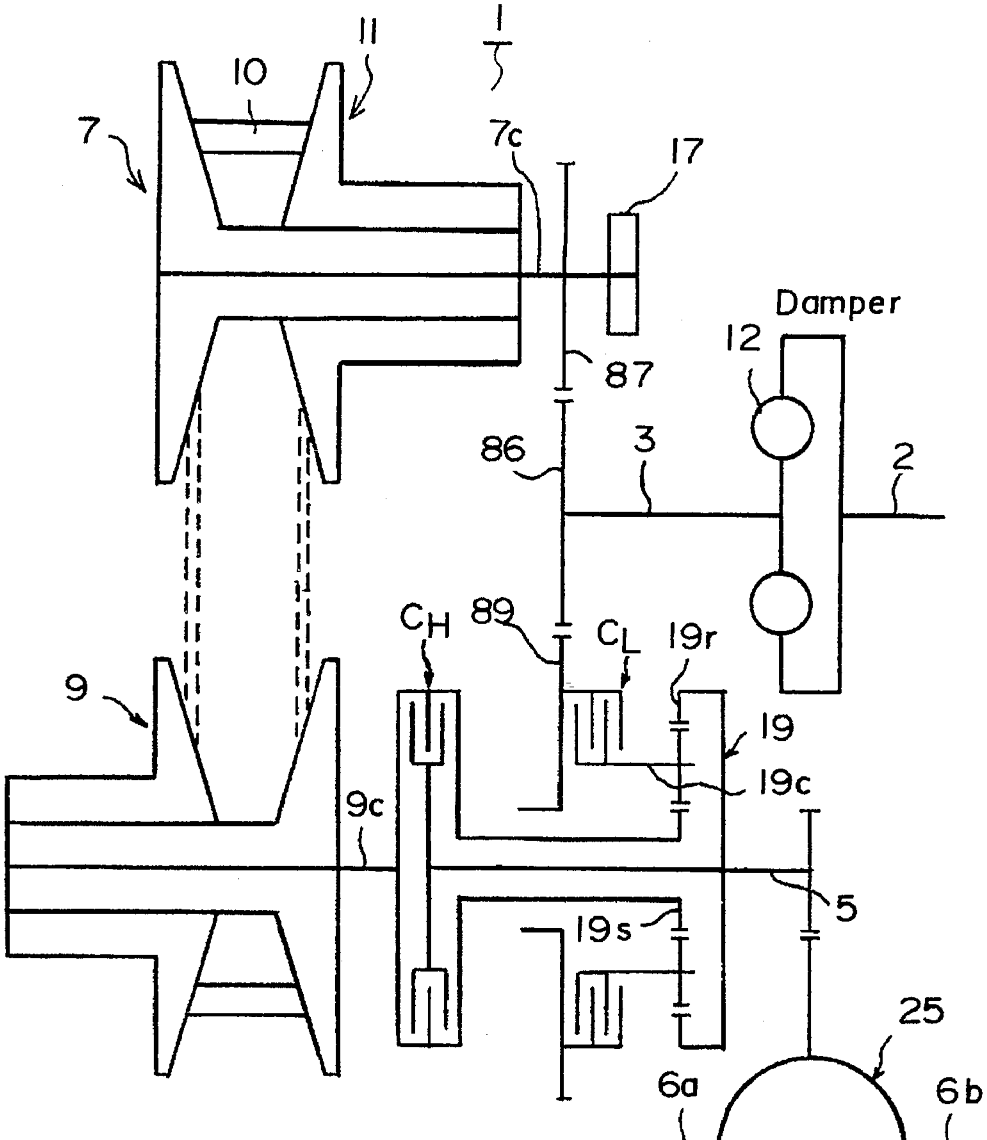
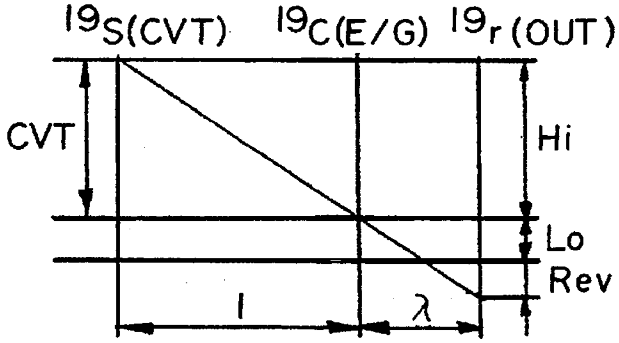
FIG. 14(b)

FIG. 15(a)
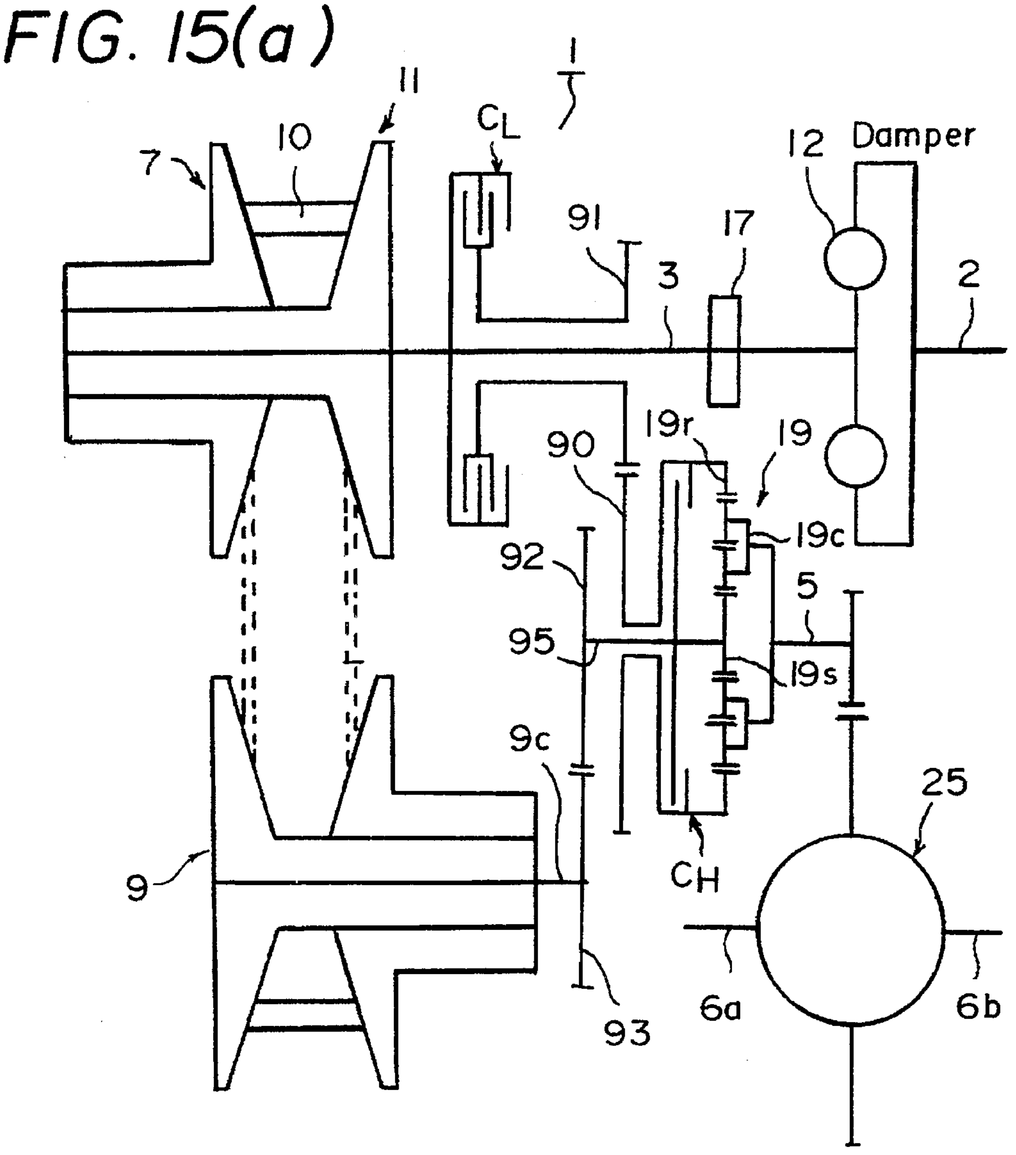
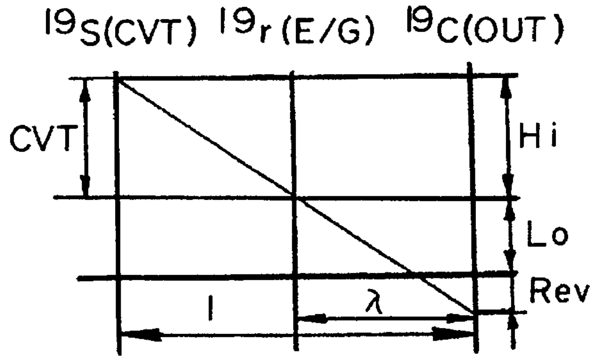
FIG. 15(b)

FIG. 16(a)
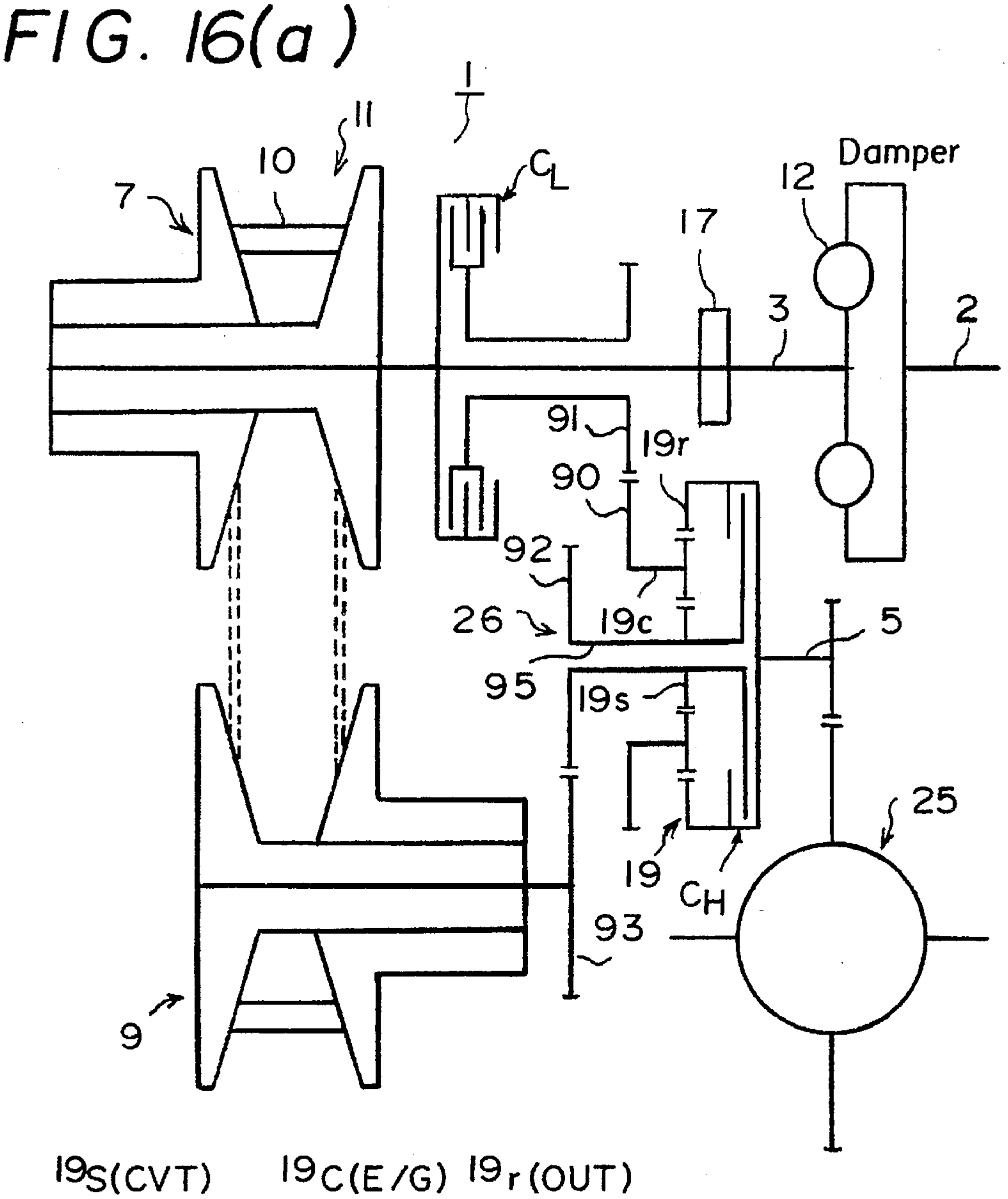
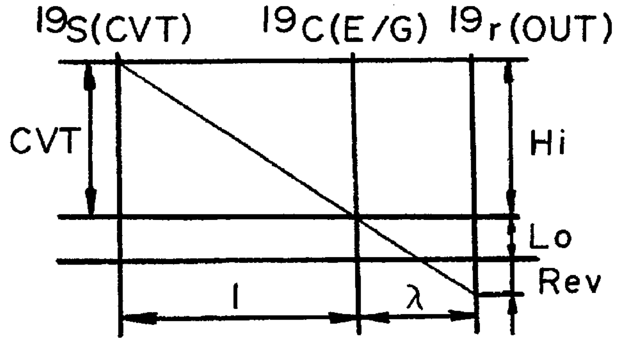
FIG. 16(b)

FIG. 17(a)
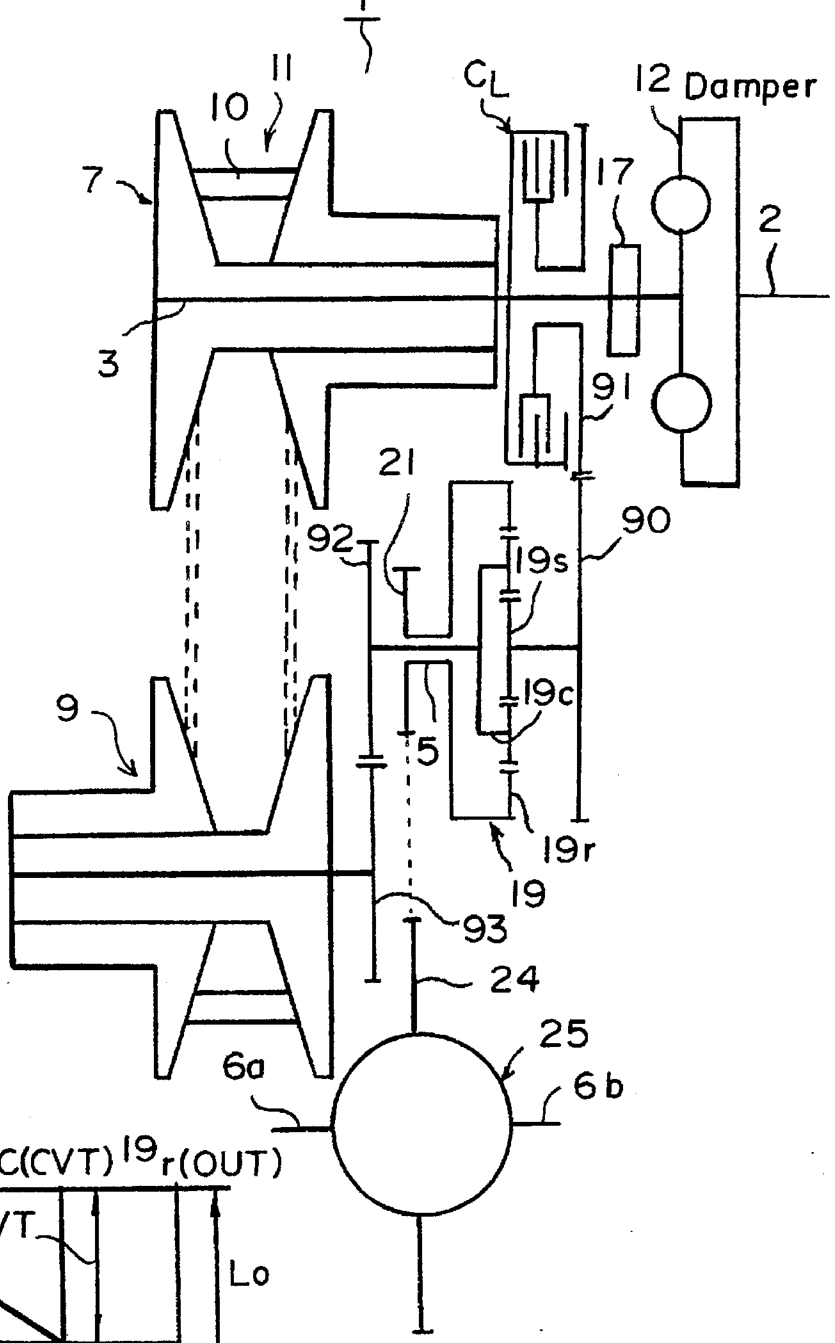
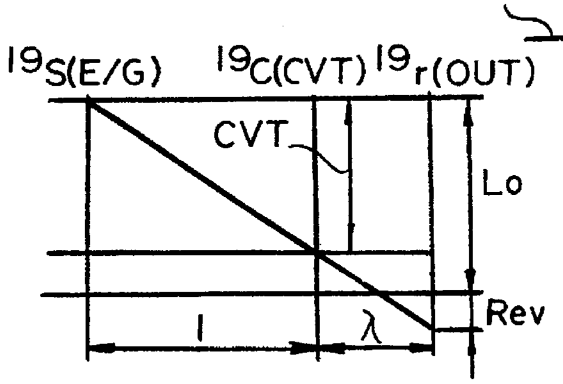
FIG. 17(b)

FIG. 18(a)
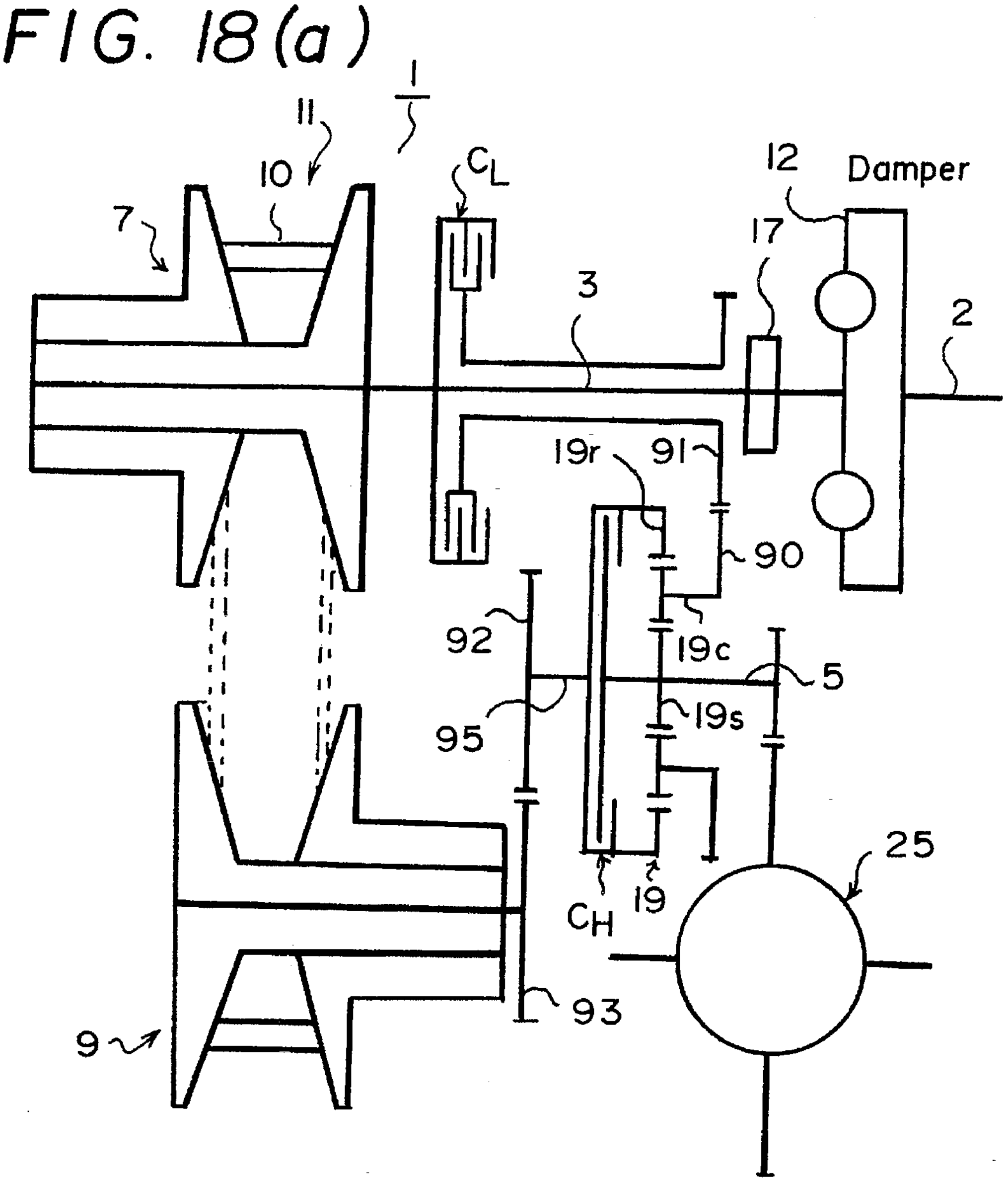
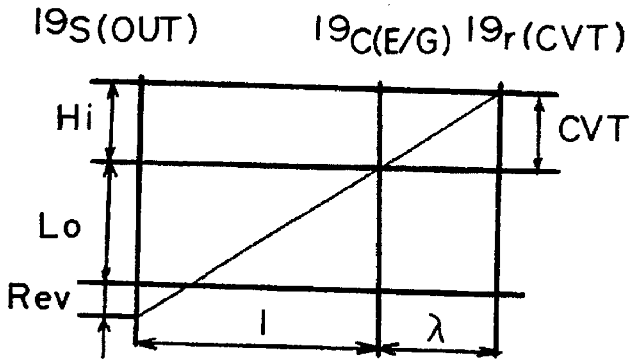
FIG. 18(b)

FIG. 19(a)
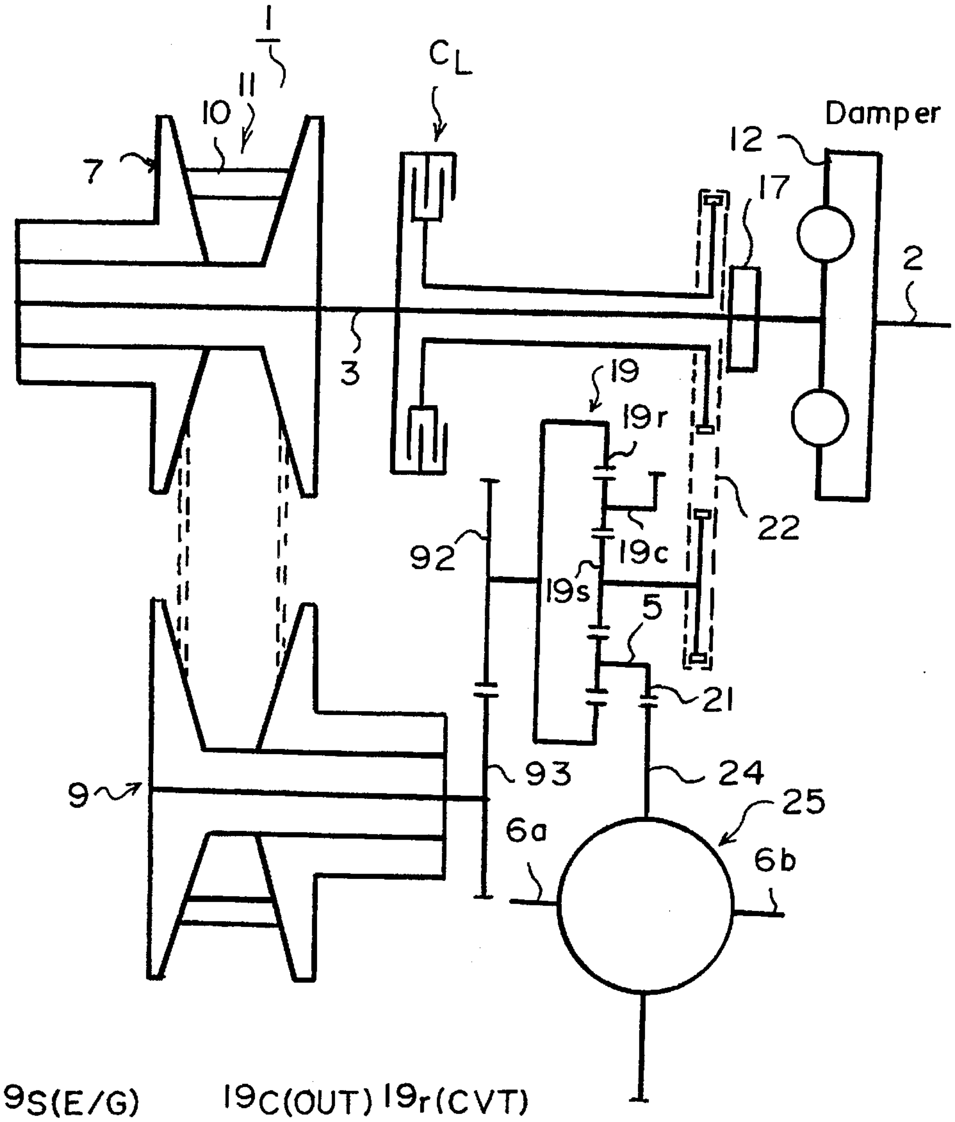
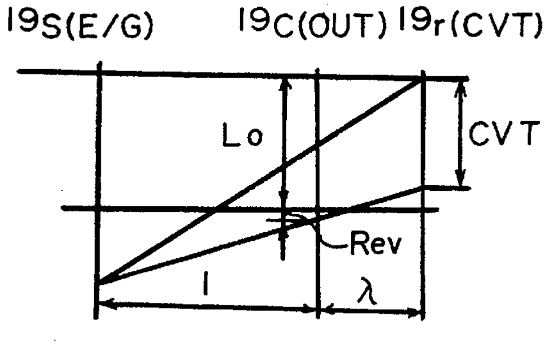
FIG. 19(b)

FIG. 20(a)
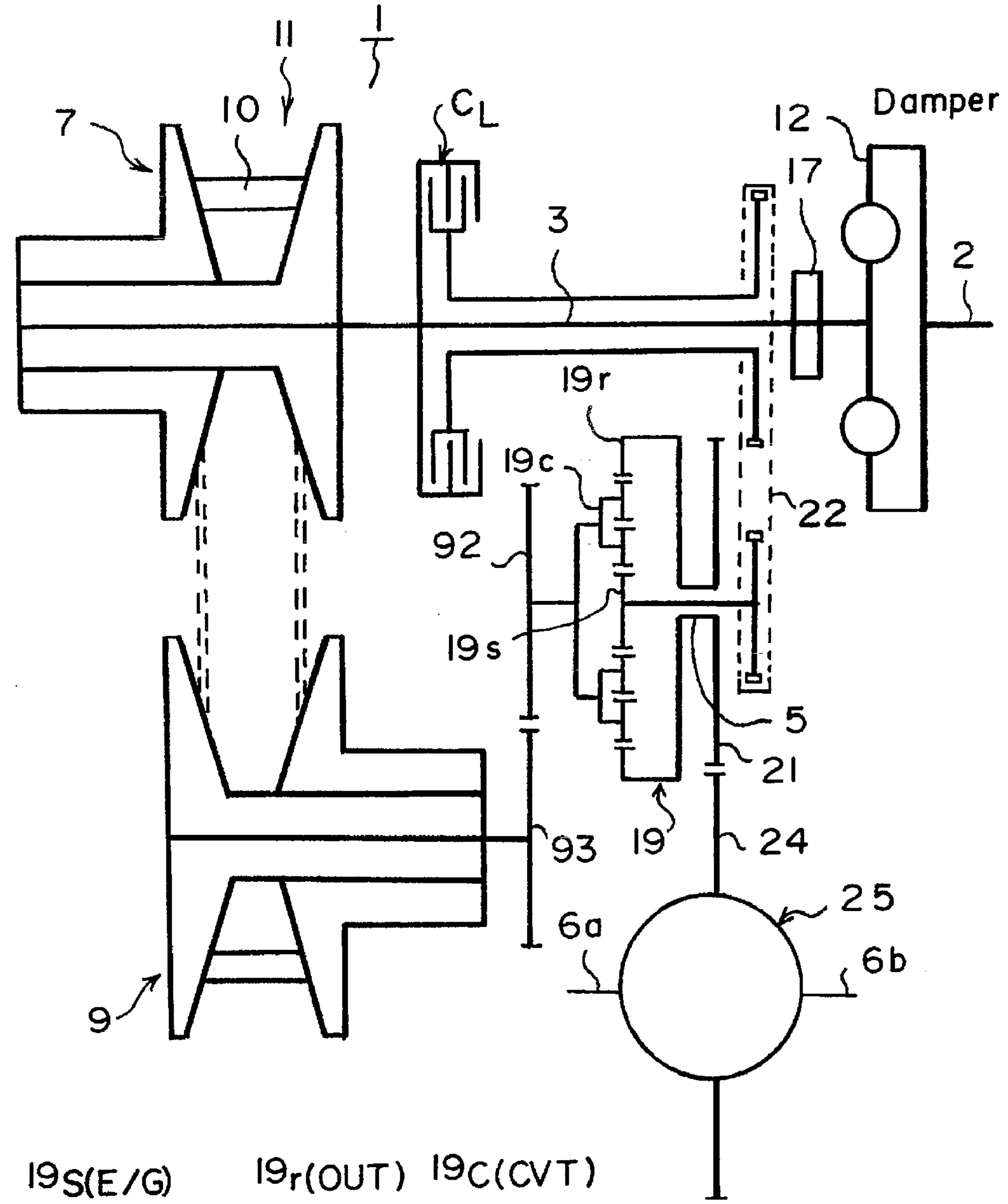
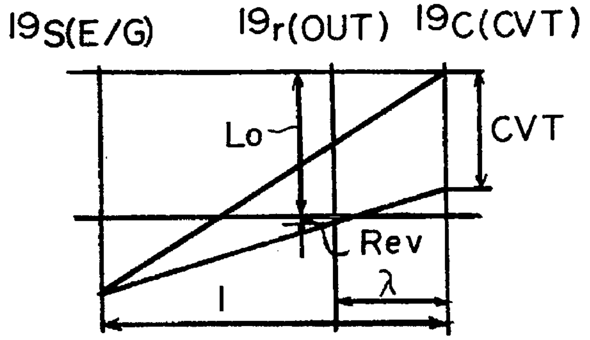
FIG. 20(b)

CONTINUOUSLY VARIABLE TRANSMISSION

BACKGROUND OF THE INVENTION

1. Field of the Invention

This invention relates to a belt type continuously variable transmission in which a belt is wound around a primary pulley and a secondary pulley, each of which is composed of two sheaves and, more particularly, to a continuously variable transmission, suitable for a transmission system for an automobile, specifically, in which the belt type continuously variable transmission and a planetary gear unit are combined.

2. Description of Related Prior Art

Automatic belt type continuously variable transmissions have drawn attention in response to demands for improvement in fuel efficiency and driveability.

Transmission systems in which a belt type continuously variable transmission (hereinafter "CVT") and a planetary gear unit are combined to augment gearshift ranges have been disclosed in the prior art, for example, in Japanese Patent Laid-Open Application No. 59-110,954. In such a transmission system, the gear ratio of the power transmission path or mechanism, such as the planetary gearing, can be set so that the CVT delivers zero output, as a whole, at a certain speed-change (pulley) ratio. In such a case, where the CVT is controlled to operate with a target speed-change ratio (target pulley ratio), the CVT does not theoretically transmit any torque (either forward or reverse) from the engine to vehicle wheels, i.e. it enters into a non-drive state with the manual clutch disengaged, wherein the engine brake does not operate. During such a nondrive state, however, the output torque varies greatly when the CVT deviates even slightly from the target pulley ratio, because the output torque ranges from infinity to zero. It is therefore difficult in a practical sense to produce the non-drive state by setting the target pulley ratio as a single point through changing and controlling the axial forces on the pulleys of the CVT.

In the CVT disclosed in the above publication, the gear ratio of the power transmission path, i.e. the gear ratio of the overall transmission system, is set to a value excluding zero such as 0.4 to 4, and the transmission is equipped with a torque converter with a direct coupling clutch (drive starter device) and a clutch brake for switching between normal (forward) and reverse rotation (normal and reverse rotation switching device).

With such a CVT, during operation with forward rotation, the engine delivers the engine torque to the primary pulley of the CVT through the torque converter and the clutch for forward rotation, as well as to a rotary gear element, e.g. sun gear, of the planetary gear unit, and the planetary gear unit thereby amplifies the output rotation of the CVT and delivers it to a differential device. During the reverse rotation, the normal and reverse rotation switching device cuts off the power transmission to the CVT, thus resulting in a stop state for the CVT. The rotation is transmitted to a rotary element or elements of the planetary gear unit through the torque converter to output the reverse rotation, with the CVT in the stop state.

The above-described CVT, however, requires a forward/reverse rotation switching device and a drive start device, such as a torque converter, and is thereby disadvantaged in terms of costs. The requirement for such devices also limit the degree to which the CVT can be made compact in size and, accordingly, its mountability in an automobile.

SUMMARY OF THE INVENTION

It is an object of the invention to provide a belt type continuously variable transmission ("CVT") which can automatically assume a zero output state (a non-drive state) even where the CVT is combined with a planetary gear unit in a single torque path.

The transmission system according to the invention includes an input shaft for receiving torque from an engine output shaft, an output shaft for driving the vehicle wheels, a CVT operative in association with the input shaft and having primary and secondary pulleys and axial force operating means for applying axial forces to both pulleys, and a planetary gear unit having first to third rotary elements operative in association with the input shaft, the secondary pulley, and the output shaft, respectively. The system further includes judging means for judging output toque and control means for switching the axial force operating means. The CVT is capable of changing the pulley ratio of the pulleys by operation of the axial force operating means and, by changing the pulley ratio, the direction of torque transmission through the planetary gear unit may be changed. Based on a signal from detecting means for detecting a vehicle operating parameter, the judging means provides a signal to the control means to control the axial force operating means. The axial force operating means is controlled to produce an axial force difference to achieve a target pulley ratio during a driving mode requiring output torque and to equalize the axial forces during a non-drive mode not requiring output torque. In neutral control the CVT self-converges toward a neutral pulley ratio so that the output from the output shaft becomes zero and is stably held at the neutral position without a fluid coupling device. Therefore, the CVT can be simplified and reduced in size, with reduced cost and improved mountability on the vehicle. The planetary gear unit may be a single or dual pinion planetary gear unit including a sun gear, a carrier, and a ring gear, each corresponding to one of "three rotary elements," as the latter terminology is used herein.

In one embodiment of the invention, the axial force operating means includes a primary hydraulic servo for operating the primary pulley and a secondary hydraulic servo for operating the secondary pulley, each of the primary and secondary hydraulic servos including a plurality of hydraulic chambers. The controlling means makes effective pressure receiving areas of the respective servos different during the drive state and equal during the non-drive state by selectively switching supply of hydraulic pressure to the respective hydraulic chambers. Each hydraulic servo may include a primary hydraulic chamber and a secondary hydraulic chamber, and the primary hydraulic chambers of both hydraulic servos have the same effective pressure receiving area. The controlling means controls a regulator valve and a ratio control valve, and hydraulic pressure from the ratio control valve is supplied to one of the secondary hydraulic chambers during the drive state and is discharged from that one secondary hydraulic chamber in non-drive state. The regulator valve can be constituted of primary and secondary regulator valves, and during the drive state both of the regulator valves operate whereas during the nondrive state only one of the regulator valves operates. The primary regulator valve may be in communication with the secondary regulator valve, and during the nondrive state, the secondary regulator valve has a larger output hydraulic pressure than the primary regulator valve. This control mechanism allows the drive and nondrive states to be switched simply and easily by changing effective pressure receiving areas of the respective hydraulic servos by switching, without adjusting, the hydraulic pressures supplied to the hydraulic servos.

Where the detecting means includes a vehicle speed sensor for detecting vehicle speed and a throttle sensor for detecting throttle opening of the engine, the judging means determines that output torque is not required when the vehicle speed is at or below a predetermined amount ($V \leqq V0$) and when the throttle opening is at or below predetermined amount ($\theta$=Idle).

According to one embodiment of the invention, during a low speed mode, the first rotary element, the second rotary element, and the third rotary element in the planetary gear unit are operative in association with the input shaft, the secondary pulley, and the output shaft, respectively, and during a high speed mode the operational association between the first rotary element and the input shaft is cut off and the secondary pulley is coupled to the output shaft. The input shaft may be coupled to the primary pulley and the first element so that the direction of torque transmission through the input shaft from the primary pulley is the reverse of the direction of torque transmission through the input shaft from the first rotary element in the drive state. The rotation of the output shaft is changed between forward and reverse directions, with transition through a neutral position where output rotational speed becomes zero, by changing the pulley ratio of the belt type continuously variable transmission. The output shaft is changed, in the low speed mode, sequentially from the reverse rotation, to the neutral position, and then to the normal rotational overdrive (forward) by changing the pulley ratio of the belt type continuously variable transmission toward the underdrive direction and, in the high speed mode, is changed toward the normal rotational overdrive direction by changing the pulley ratio of the belt type continuously variable transmission toward an overdrive direction.

In another aspect of the invention, the controlling means adjusts, based on the judging means, the difference between the axial forces on both pulleys produced by the axial force operating means, during the drive state, to a value to achieve a target pulley ratio with respect to the input torque to the belt type continuously variable transmission at that time. During the non-drive state, the difference is adjusted to a smaller value, within a range wherein the relationship between amounts of the axial forces on the pulleys does not change, than the difference between the axial forces on both pulleys that would be determined by the input torque and the pulley ratio of the belt type continuously variable transmission at that time if the torque direction of the output shaft was positive or negative. The non-drive state created as above allows neutral control to be implemented without need for precisely holding the axial forces on both pulleys by a pre-loading spring or the like.

BRIEF DESCRIPTION OF THE DRAWINGS

The above and other objects and features of the invention will become apparent to those skilled in the art from the following description of preferred embodiments, when considered in conjunction with the accompanied drawings, in which:

FIG. 1(*b*) is a speed diagram of operation of the system of FIG. 1(*a*);

FIG. 1(*c*) is a diagram of torque circulation within the embodiment of FIG. 1(*a*) operating in forward;

FIG. 5 is a table of the operations of the hydraulic control circuit shown in FIG. 4;

FIG. 6 is a flowchart of a main routine used in control of the CVT;

FIG. 9(*b*) is a graph of axial force versus CVT and system ratios showing a neutral control range;

FIG. 12 is a table of the operations of the hydraulic control system shown in FIG. 11;

FIG. 14(*a*) is a skeletal diagram of a second embodiment of a transmission system including a CVT according to the invention;

FIG. 14(*b*) is a speed diagram of operation of the transmission system of FIG. 14(*a*);

FIG. 15(*a*) skeletal diagram of a third embodiment of a transmission system including a CVT according to the invention;

FIG. 15(*b*) is a speed diagram of operation of the transmission system of FIG. 15(*a*);

FIG. 16(*a*) is a skeletal diagram of a fourth embodiment of a transmission system including a CVT according to the invention;

FIG. 16(*b*) is a speed diagram of operation of the transmission system of FIG. 16(*a*);

FIG. 17(*a*) is a skeletal diagram of a fifth embodiment of a transmission system including a CVT according to the invention;

FIG. 17(*b*) is a speed diagram of operation of the transmission system of FIG. 17(*a*);

FIG. 18(*a*) is a skeletal diagram of a sixth embodiment of a transmission system including a CVT according to the invention;

FIG. 18(*b*) is a speed diagram of operation of the transmission system of FIG. 18(*a*);

FIG. 19(*a*) is a skeletal diagram of a seventh embodiment of a transmission system including a CVT according to the invention;

FIG. 19(*b*) is a speed diagram of operation of the transmission system of FIG. 19(*a*);

FIG. 20(*a*) is a skeletal diagram of a eighth embodiment of a transmission system including a CVT according to the invention; and FIG. 20(*b*) is a speed diagram of operation of the transmission system of FIG. 20(*a*).

DETAILED DESCRIPTION OF PREFERRED EMBODIMENTS

Figure 1C:
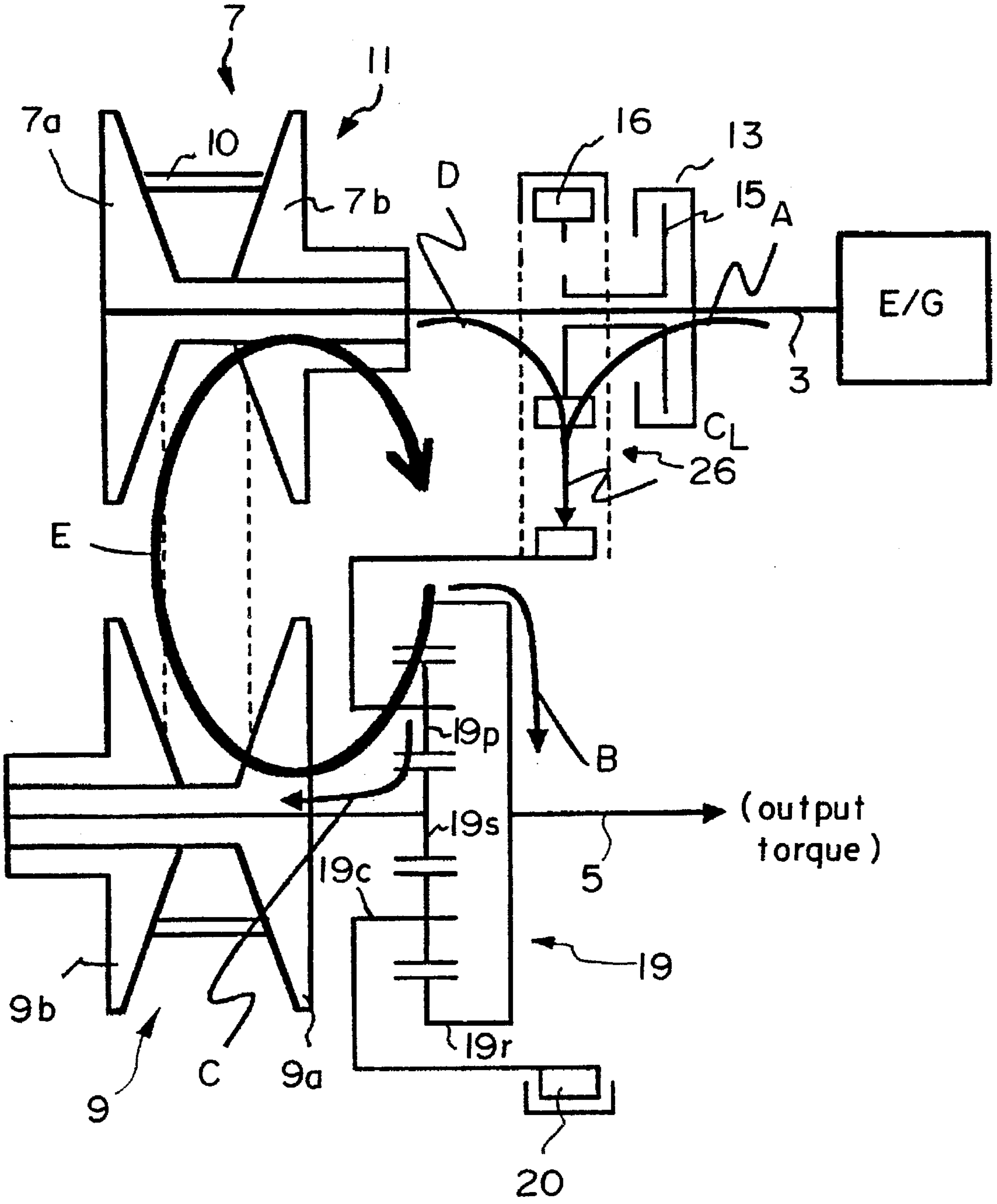
FIG. 1(*a*) is a skeletal diagram of a first embodiment of a transmission system including a CVT according to the invention.

Referring to FIG. 1(*a*), a power transmission system including a CVT according to the invention is described. The power transmission system 1 for a vehicle includes a first shaft 3 aligned with an engine crankshaft 2, a second shaft 5, and third shafts 6 (a, b) aligned with front wheel shafts. In the CVT 11, a primary pulley 7 is supported on the first shaft 3; the secondary pulley 9 is supported on the second shaft 5; and a belt 10 is wound around both pulleys 7, 9.

The first shaft 3 is coupled to the engine crankshaft 2 through a damper 12 to form an input shaft. An input side member 13 of a low clutch $C_L$ is secured to the input shaft 3 and an output side member 15 is rotatably supported on the input shaft 3. A primary side sprocket 16 is united to the output side member 15 to form a power transmission means. The stationary sheave **7*a* of the primary pulley 7 is secured to the input shaft 3, the distal end of which drives an oil pump 17. A movable sheave 7*b* is supported on the stationary sheave 7*a* for axial movement relative thereto. The secondary pulley 9 is rotatably supported on the second shaft 5. The secondary pulley 9 includes a stationary sheave 9*a*, a movable sheave 9*b* supported on the stationary sheave 9*a* for axial movement relative thereto, and a secondary shaft 9*c* fixed to the stationary Sheave. A high clutch $C_H$ is located between the second shaft 5 and secondary shaft 9*c*. A planetary gear unit 19 is formed on the second shaft 5. A secondary side sprocket 20 is rotatably supported on the second shaft 5. An output gear 21 is secured to one end of the second shaft 5**.

The planetary gear unit 19 is a single pinion planetary gear unit including a sun gear **19*s*, a ring gear 19*r*, and a carrier 19*c* rotatably supporting pinions 19*p* each meshing with both gears. The sun gear 19*s* is coupled to the secondary shaft 9*c* and serves as a "second rotary element"; the ring gear 19*r* is coupled to the output shaft 5 and serves as a "third rotary element"; the carrier 19*c* is coupled to the secondary side sprocket 20 and serves as a "first rotary element". An endless drive element 22, such as a silent chain, a roller chain, or a timing belt, is wound around and drivably connects the primary and secondary side sprockets 16, 20. The gear 21 secured to the output shaft 5 meshes with a large gear 23*a* of an underdrive gear unit 23, whose small gear 23*b* meshes with a ring gear 24 of a differential device 25, and the differential device 25 outputs differential rotations, respectively, to left and right axle shafts 6*a*, 6*b*** forming the third shaft.

Referring to FIGS. 1(*a*), 1(*b*), 1(*c*), 2 and 3, operation of the transmission system 1 is described. The rotation of the engine crankshaft 2 is transmitted to the input shaft 3 through the damper 12. In the low speed mode, in which the low clutch $C_L$ is engaged and the high clutch $C_H$ is disengaged, the rotation of the input shaft 3 is transmitted to the primary pulley 7 and to the carrier **19*c* of the planetary gear unit 19 through a power transmitting unit 26 formed of the primary side sprocket 16, the endless drive element 22, and the secondary side sprocket 20. The rotation of the primary pulley 7 is transmitted to the secondary pulley 9, with the speed continuously changing by controlling the pulley ratio between the primary and secondary pulleys by operation of axial force operating means, e.g. hydraulic servos, acting on the movable sheaves as described below. The rotary speed of the pulley 9 is transmitted to the sun gear 19*s* of the planetary gear unit 19**.

As shown in a speed diagram of FIG. 1(*b*), in the planetary gear unit 19, the output from the CVT 11 is transmitted to the sun gear **19*s* while the carrier 19*c* serves as a reaction force element to which a constant rotary speed is transmitted through the power transmission unit 26. The output rotations of the carrier 19*c* and the sun gear 19*s* are integrated within the planetary gear unit 19 and transmitted to the output shaft 5 through the ring gear 19*r*. Since the ring gear 19*r*, which is not a rotary element bearing a reaction force, is coupled to the output shaft 5 in the low speed mode, the planetary gear unit 19** produces torque circulation as shown in FIG. 1(*c*) and rotates the output shaft 5 with either normal (forward) rotation (Lo) or reverse rotation (Rev) with transition therebetween through zero rotation, because the sun gear **19*s* and the carrier 19*c* rotate in the same direction. In other words, within the torque transmission circuit, the torque in the CVT 11 is transmitted from the secondary pulley 9 to the primary pulley 7 with the output shaft 5 rotating in the normal (forward) direction and, in reverse rotation, torque within the CVT is transmitted from the primary pulley 7 to the secondary pulley 9**, with the output shaft rotating in the reverse (rearward) direction.

FIG. 1(*c*) shows torque circulation through the belt type continuously variable transmission unit (CVT) 11 with the output shaft 5 rotating in the aforementioned forward direction. In this state, torque from engine E/G is output through power transmission unit 26 to the first rotary element (in this embodiment carrier **19*c*) as indicated by arrow "A". A planetary gear unit 19 outputs a portion of that engine torque as indicated by arrow "B" and recirculates a second portion of the input torque back through the CVT 11 as indicated by arrow "C". That portion of the torque routed back to CVT 11 is returned to the first rotary element as indicated by arrow "D". In this manner, a loop of torque circulating through the CVT is established as indicated by arrow "E". In a conventional CVT, the power transmission path, in which engine torque is transmitted to an output shaft, is via a single path, i.e. through the V-belt of the CVT. In contrast, in the torque-circulation-type-CVT of the present invention two torque transmission paths are established, one path through the CVT unit 11 and planetary gear unit 19 and a second through the power transmission unit 26 and the planetary gear unit 19**. The amounts of torque transmitted through these two paths is changed by changing the pulley ratio of the CVT. It should be noted that the transmission system of the present invention dispenses with the conventional fluid transmission unit, e.g. torque converter, or electromagnetic clutch. Further, the transmission system of the present invention does not have separate clutches for establishing forward and reverse—note that the clutch $C_L$ is engaged in both forward and reverse.

In the high speed mode, in which the low clutch $C_L$ is disengaged and the high clutch $C_H$ is engaged, torque transmission through the power transmission unit 26 to the planetary gear unit 19 is cut off, and the planetary gear unit 19 enters into a unitary rotating state by engagement of the high clutch $C_H$. The rotation of the input shaft 5 is therefore transmitted to the output shaft 5 exclusively through the CVT 11 and the high clutch $C_H$. The rotation of the output shaft 5 is transmitted to the differential device 25 through the output gear 21 and the underdrive gear unit 23 and then transmitted to the left and right front wheels through the left and right axle shafts **6*a*, 6*b***.

Figure 2:
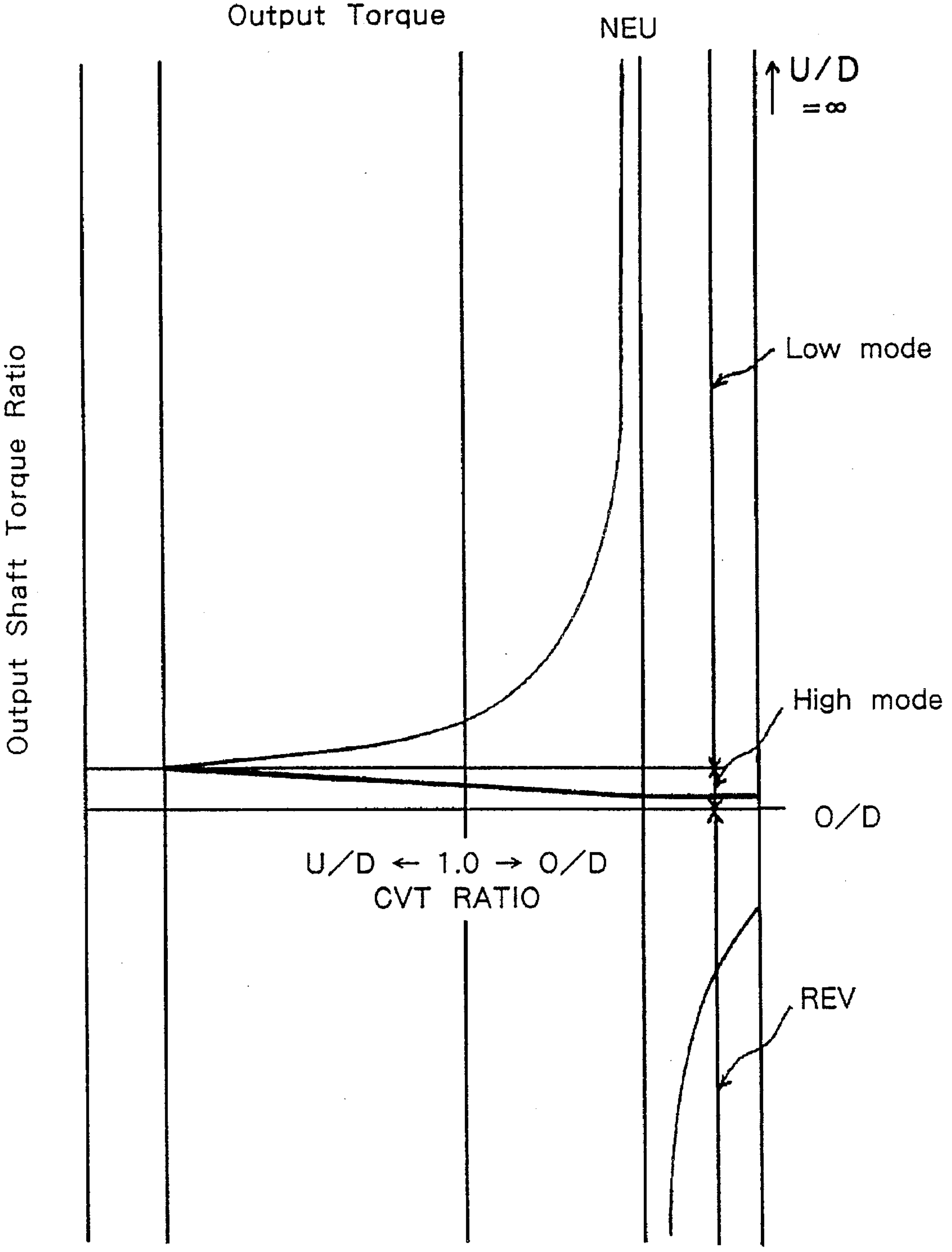
FIG. 2 is a graph of output torque versus torque ratio of the belt type CVT.
Figure 3:
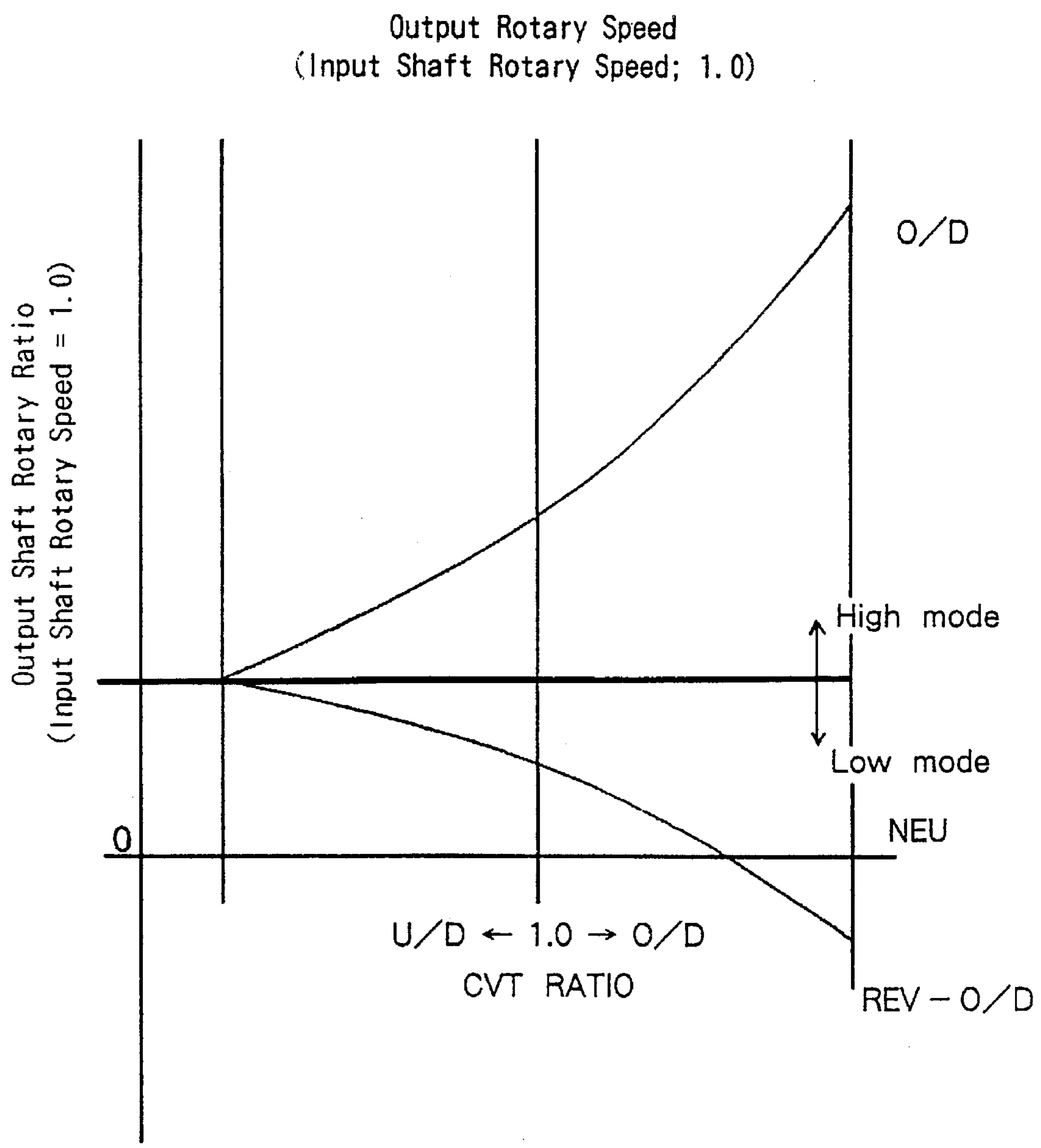
FIG. 3 is a graph of output rotational speed versus torque ratio of the CVT.

In the low speed mode, as shown in the speed diagram of FIG. 1(*b*), output torque diagram of FIG. 2, and output speed diagram of FIG. 3, when the CVT 11 reaches the limit (O/D edge) of its overdrive speed (located on line "a" in FIG. 1), the ring gear 19*r* is reversely rotated, counter to the rotation of the carrier 19*c* rotating with a constant speed, with the sun gear 19*s* rotating at maximum speed, and the reverse rotation (REV) is transmitted to the output shaft 5. When the CVT 11 is switched over to an underdrive, or speed reduction mode, the reversed rotational speed is reduced, and the transmission system 1 enters into a neutral state (NEU) in which the speed of the output shaft 5 becomes zero at a predetermined pulley ratio determined by the gear ratio of the planetary gear unit 19 and the power transmission device 26. When the CVT 11 is further moved toward the underdrive direction, the ring gear 19*r* is switched to rotate in the forward (normal) direction, and this rotation in the forward direction is transmitted to the output shaft 5. As is apparent from the curve for output torque in FIG. 2, the torque of the output shaft 5 goes to infinity near the neutral position NEU.

When the CVT 11 reaches the limit for underdrive (U/D), the high clutch $C_H$ is engaged to establish the high speed mode. In the high speed mode, the output rotation of the CVT 11 is transmitted as is to the output shaft 5, so that a horizontal line indicated by "b" in the speed diagram of FIG. 1(*b*) is obtained. As the CVT 11 changes its speed in the overdrive direction, the rotation of the output shaft 5 is now also changed toward the overdrive direction, and the transmission torque is thereby reduced that much. It is to be noted that λ in FIG. 1(*b*) represents the ratio (Zs/Zr) of the number of teeth of the sun gear to the number of teeth of the ring gear.

Figure 4:
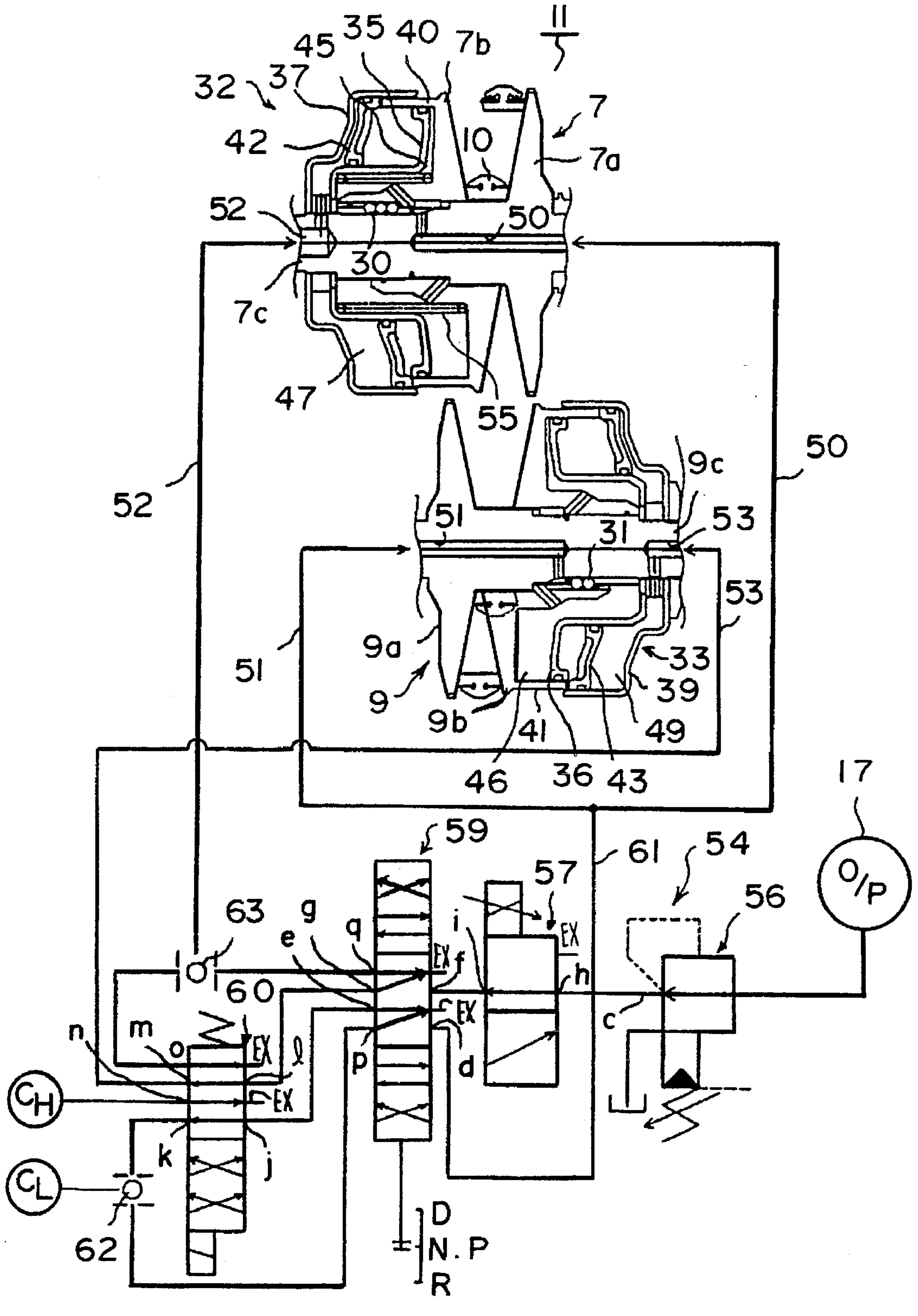
FIG. 4 is a hydraulic circuit diagram showing a first embodiment of a hydraulic control system for the CVT according to the invention.

As seen in FIG. 4, in the primary and secondary pulleys 7, 9, the movable sheaves 7*b*, 9*b* are supported on boss portions 7*c*, 9*c* of the stationary sheaves 7*a*, 9*a* by ball splines 30, 31, respectively, so as to be movable in the axial direction. The hydraulic servos 32, 33 serve as the axial force operating means to exert axial forces on the movable sheeves 7*b*, 9*b*, and, for this purpose, are axially aligned in contact with the movable sheaves 7*b*, 9*b*. Both hydraulic servos 32, 33 include diaphragms 35, 36, cylinders 37, 39 secured to the stationary sheave boss portions 7*c*, 9*c*, drum members 40, 41 and second piston members 42, 43 secured behind and in contact with the movable sheaves 7*b*, 9*b*, respectively. The diaphragms 35, 36 are respectively fitted in the drum members 40, 41 in an oiltight manner. The second piston members 42, 43 are respectively fitted between the cylinders 37, 39 and diaphragms 35, 36 in an oil-tight manner. The hydraulic servos 32, 33 have a double piston structure composed of primary hydraulic chambers 45, 46 and secondary hydraulic chambers 47, 49.

In the primary hydraulic chambers 45, 46 the back faces of the movable sheaves 7*b*, 9*b* constitute piston faces. The effective pressure receiving areas of the piston faces are equal as between the primary side and the secondary side. The stationary sheave boss portions 7*c*, 9*c* on the primary side and the secondary side are formed with hydraulic passages 50 to 53 in hydraulic communication with the primary hydraulic chambers 45, 46 and the secondary hydraulic chambers 47, 49. A spring 55 for pre-loading is arranged in a compressed state in the primary hydraulic chamber 45 of the primary side hydraulic servo 32.

The hydraulic control unit 54, which serves as control means in the embodiment of FIG. 4, includes a regulator valve 56, a ratio control valve 57, a manual valve 59, and a low and high control valve 60. The hydraulic pressure from the oil pump 17 is properly adjusted, or regulated, by the hydraulic control unit 54 and is selectively fed to the primary and secondary hydraulic chambers 45, 46, 47, 49 of the hydraulic servos 32, 33 and to the low clutch (or its servo) $C_L$ and the high clutch (or its servo) $C_H$.

Referring now to FIGS. 4 to 10, the operation of the hydraulic control unit 54 will be described. As shown in FIG. 5, during the low speed (L) mode of the D range, a predetermined hydraulic pressure is supplied to the primary hydraulic chamber 45 of the primary side hydraulic servo 32. Likewise, a predetermined hydraulic pressure is supplied to both the primary hydraulic chamber 46 and the secondary hydraulic chamber 49 of the secondary side hydraulic servo 33; and the low clutch $C_L$ is engaged by operation of the hydraulic pressure. That is, the regulator valve 56 controls the hydraulic pressure from the oil pump 17, and the adjusted output hydraulic pressure from the output port c is fed to the primary hydraulic chamber 45 of the primary side hydraulic servo 32 through the hydraulic passages 61, 50, 51 and to the primary hydraulic chamber 46 of the secondary side hydraulic servo 33.

During the low speed mode, the manual valve 59 is moved to the D position to bring a port d into communication with a port e and a port f into communication with a port g. The ratio control valve 57 is switched and held in a position where a port h communicates with a port i. The low and high control valve 60 is switched and held in a position where a port j communicates with a port k and a port l communicates with a port m. The adjusted hydraulic pressure from the output port c is supplied to the secondary hydraulic chamber 49 of the secondary side hydraulic servo 33 through the ports h, i of the ratio control valve 57, the ports f, g of the manual valve 59, and the ports l, m of the low and high control valve 60 and is further supplied to a hydraulic servo $C_L$ for the low clutch through the ports d, e of the manual valve 59, the ports j, k of the low and high control valve 60, and a mutual check valve 62.

Thus, as the low clutch $C_L$ is engaged, the axial force produced by the secondary side hydraulic servo 33 which, in turn, is a product of the hydraulic pressure received in both of the primary and secondary hydraulic chambers 46, 49, becomes larger than the axial force produced by the primary side hydraulic servo 32 in which the hydraulic pressure is received in only the primary hydraulic chamber 45. The axial forces produced by both hydraulic servos 32, 33 are properly controlled by controlling the degree of opening of the ratio control valve 57, while torque is transmitted from the secondary pulley 9 to the primary pulley 7, thereby changing the pulley ratio (torque ratio) as required. The engine torque transmitted from the input shaft 3 to the carrier 19*c* of the planetary gear unit 19 through the low clutch $C_L$ and the power transmission mechanism 26 is output through the ring gear 19*r* to the output shaft 5, subject to limitation by the pulley ratio of the CVT.

During the high speed (H) mode of the D range, as shown in FIG. 5, predetermined hydraulic pressure is supplied to the primary and secondary hydraulic chambers 45, 47 of the primary side hydraulic servo 32 and to the primary hydraulic chamber 46 of the secondary side hydraulic servo 33, as well as to a hydraulic servo $C_H$ for the high clutch. That is, the adjusted output hydraulic pressure from the output port c of the regulator valve 56 is supplied to the primary hydraulic chamber 45, 46 of the primary and secondary side hydraulic servos 32, 33 through the hydraulic passages 61, 50, 51.

Though the ratio control valve 57 and the manual valve 59 are positioned the same in high speed mode as in the low speed mode, the low and high control valve 60 is switched to a position to place the port j in communication with a port n and the port l in communication with a port o. The adjusted hydraulic pressure from the output port c is supplied to the secondary hydraulic chamber 47 of the primary side hydraulic servo 32 through the ports h, I of the ratio control valve 57, the ports f, g of the manual valve 59, the ports l, o of the low and high control valve 60, a mutual check valve 63, and the hydraulic passage 52 and supplied to a hydraulic servo $C_H$ for the high clutch through the ports d, e of the manual valve 59, and the ports j, n of the low and high control valve 60.

Consequently, in the CVT 11, the axial force produced by the primary side hydraulic servo 32 in which the hydraulic pressure operates on both of the primary and secondary hydraulic chambers 45, 47 becomes larger than the axial force produced by the secondary side hydraulic servo 33 in which the hydraulic pressure operates only on the primary hydraulic chamber 46. The axial forces produced by both of the hydraulic servos 32, 33 are controlled by the ratio control valve 57 while the CVT 11 is in the state of transmitting torque from the secondary pulley 9 to the primary pulley 7, thereby achieving a target pulley ratio (torque ratio). When the engine torque is transmitted from the input shaft 3 through the CVT 11, i.e. from the primary pulley 7 to the secondary pulley 9, the torque is output at the output shaft 5 through the high clutch $C_H$.

In the reverse range (R), as shown in FIG. 5, a predetermined hydraulic pressure is supplied to the primary and secondary hydraulic chambers 45, 47 of the primary side hydraulic servo 32 and to the primary hydraulic chamber 46 of the secondary side hydraulic servo 33, as well as to the hydraulic servo $C_L$ for the low clutch. That is, the adjusted output hydraulic pressure from the output port c of the regulator valve 56 is supplied to the primary hydraulic chamber 45, 46 of the primary and secondary side hydraulic servos 32, 33 through the hydraulic passages 61, 50, 51. In the reverse range, though the ratio control valve 57 is positioned the same as described above, the manual valve 59 is moved to the R position to communicate the port d with a port p and the port f with a port q. The low and high control valve 60 is notedly irrelevant to the control in reverse. The adjusted hydraulic pressure from the output port c is supplied to the hydraulic servo $C_L$ for the low clutch through the ports d, p of the manual valve 59 and the mutual check valve 62 and is then fed to the secondary hydraulic chamber 47 of the primary side hydraulic servo 32 through the ports h, i of the ratio control valve 57, the ports f, q of the manual valve 59, the mutual check valve 63, and the hydraulic passage 52.

Thus, as the low clutch $C_L$ is engaged, the axial force produced by the primary side hydraulic servo 32, because the hydraulic pressure operates on both of the primary and secondary hydraulic chambers 45, 47, becomes higher than the axial force produced by the secondary side hydraulic servo 33 which receives hydraulic pressure only in the primary hydraulic chamber 46. The CVT 11 transmits torque from the primary pulley 7 to the secondary pulley 9, with the ratio control valve 57 controlling the pulley ratio. When the CVT 11 has a pulley ratio within a defined overdrive (O/D) range, the engine torque from the input shaft 3 is transmitted to the carrier 19*c* of the planetary gear unit 19 through the low clutch $C_L$ and the power transmission mechanism 26 and also to the sun gear 19*s* through the CVT 11 and both torques are integrated within the planetary gear unit 19 and output at the output shaft 5 as reverse rotation through the ring gear 19*r*. It is to be noted that, as shown in FIG. 5, when the manual valve 59 is at the park position P or the neutral position N, the low clutch $C_L$ and the high clutch $C_H$ are both disengaged, and a predetermined hydraulic pressure is supplied to the primary hydraulic chambers 45, 46 of the primary and secondary side hydraulic servos 32, 33.

Neutral control is provided by the control mechanism 54 as follows. First, in the main routine shown in FIG. 6, the electric control unit (ECU) judges whether or not the continuously variable transmission is currently driving in the low speed mode (S1), whether or not the vehicle is travelling at a speed less than a preset vehicle speed V0 (S2), and whether or not the throttle opening θ is at idle. When the judgments are all YES at steps S1, S2, and S3, or when the CVT has already been found to be in the low speed mode, then neutral control is executed (S4). When the judgment is NO in step S1 or S2, or when the vehicle moving at a speed higher than the preset speed, then the normal variable speed control is executed (S5) to control the CVT at a speed along the optimum fuel efficiency curve or maximum power curve. When the judgment is NO at step S3, or when the throttle opening is not at idle, the start driving control is executed to start driving (S6).

Figure 7:
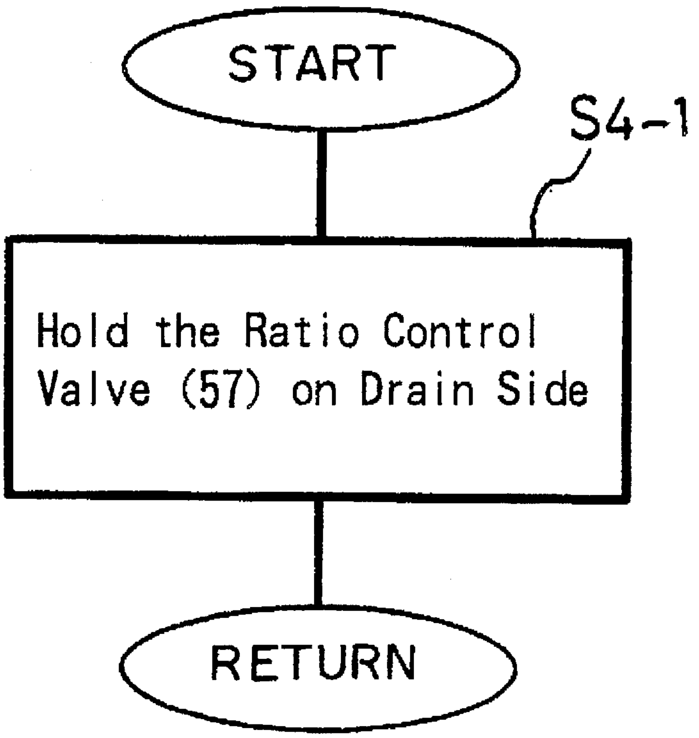
FIG. 7 is a flowchart of a subroutine for neutral control in the main routine in FIG. 6.

As shown in the neutral control subroutine of FIG. 7, the neutral control is executed (S4-1) by switching and holding the ratio control valve 57 in the drain position. That is, although the manual valve 59 is at the D-position described above and the low and high control valve 60 is at the low mode position described above, the ratio control valve 57 is switched to the position where the port i communicates with a drain port EX. In this situation, the adjusted pressure from the output port c of the regulator valve 56 is supplied to the primary hydraulic chambers 45, 46 of the primary and secondary side hydraulic servos 32, 33 through the hydraulic passages 61, 50, 51 and to the hydraulic servo $C_L$ for the low clutch through the ports d, e of the manual valve 59 and the ports j, k of the low and high control valve 60. The hydraulic pressure of the secondary hydraulic chamber 49 of the secondary side hydraulic servo 33, which had been operating in the low mode as described above, is drained through the ports m, 1 of the low and high control valve 60, the ports g, f of the manual valve 59, the port i of the ratio control valve 57, and the drain port EX.

Accordingly, since the same hydraulic pressure is supplied to the primary chambers 45, 46 which have the same effective pressure receiving areas in the primary and secondary side hydraulic servos 32, 33, in the CVT identical axial forces are exerted on the primary pulley 7 and the secondary pulley 9, thereby maintaining the low mode in which the low clutch $C_L$ is engaged.

Figure 8:
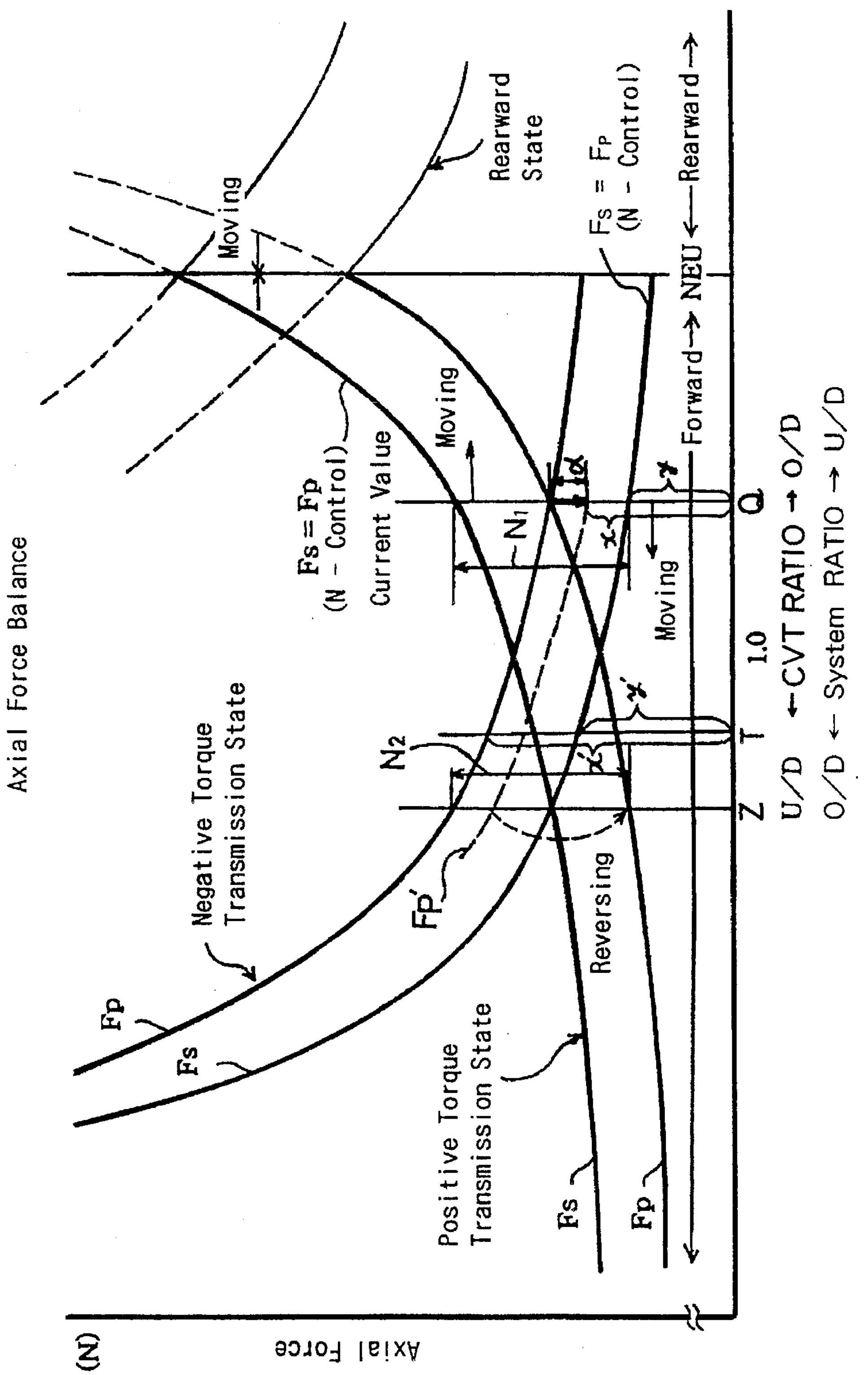
FIG. 8 is a graph of axial force versus CVT and system ratios, illustrating axial force balance of primary and secondary pulleys, in the embodiment in FIG. 1(*a*)

Referring to FIG. 8, the neutral control in which the CVT 11 self-converges to a predetermined pulley ratio with zero output at the output shaft 5 is achieved by equalizing the axial forces on the primary pulley 7 and the secondary pulley 9. During forward driving in the low mode (wherein power is transmitted from the engine to the drive wheels), the secondary pulley 9 serves as the driving side while the primary pulley 7 serves as the driven side to establish the torque path described above, and the axial force Fs of the secondary pulley thereby becomes larger than the axial force Fp of the primary pulley (Fs>Fp), balancing them at a certain value determined by the input torque and the pulley ratio. When the throttle θ moves to the idling position with the vehicle coasting, the neutral control begins. This establishes a state of negative torque transmission wherein torque is transmitted from the drive wheels. As described above, the axial force Fs of the secondary pulley 9 is set to be equal to the axial force Fp of the primary pulley 7 (Fs=Fp). To maintain the condition (Fp>Fs), i.e. the low speed coasting state (the negative torque transmission state), the axial force Fs on the secondary pulley tends to exceed the axial force Fp on the primary pulley. The effective diameter of the secondary pulley 9 is therefore increased whereas the effective diameter of the primary pulley 7 is reduced to change the CVT 11 toward underdrive (U/D). Consequently, the output speed of the entire transmission system 1, at the output shaft 5, shifts to the overdrive (O/D).

The engine speed is reduced as the change toward overdrive proceeds within the transmission system, and the speed of the vehicle is reduced. When the engine speed becomes lower than the idling speed, the negative torque state in which the engine speed reduction is restricted by the speed of the drive wheels, a changeover now occurs, producing a positive torque transmission state in which the torque is transmitted from the engine to the drive wheels, so that the vehicle makes the transition from the coasting state to the driving state.

During the low mode forward drive state, although the secondary side axial force Fs is balanced to maintain the state wherein Fs>Fp. Therefore, to establish equal axial forces (Fs=Fp) for neutral control, the effective diameter of the primary pulley 7 is increased, thereby causing the CVT 11 to move toward overdrive, so that the overall output of the transmission system 1, at the output shaft 5, moves toward underdrive (U/D).

The engine speed is then increased with respect to the wheel speed (vehicle driving speed), and the engine enters into a negative torque state, thereby placing the vehicle in a low mode coasting state. To reassume the running state (Fp>Fs), the CVT 11 is moved toward underdrive, whereby, overall, the transmission system 1 moves toward overdrive. This operation is repeated until the vehicle stops a state where the output torque of the entire transmission system is zero (the same as when the manual clutch is "OFF") while the engine speed is held at idle, or while the engine output is zero. It is to be noted that during neutral control, similar to when the vehicle speed is quickly reduced by applying a foot brake, the CVT 11 automatically adjusts to nullify the output of the entire transmission system at output shaft 5.

As described above, after the CVT self-converges and the vehicle has stopped, the vehicle stop state is stably maintained. That is, for example, if the CVT 11 shifts toward underdrive (U/D), or the forward direction of the transmission system 1, the engine speed is reduced to place the engine in a positive torque drive state, in accordance with movement of the overall transmission system toward overdrive. As described above, similarly, the CVT 11 and the transmission system 1 then change speed toward the overdrive and underdrive directions, respectively, and the transmission is returned to the neutral position (NEU) where the speed of output shaft 5 is zero. On the contrary, when the CVT is shifted toward the overdrive and the overall transmission system is thereby shifted toward underdrive, the primary pulley 7 comes to serve as the driving side while the secondary pulley 9 comes to serve as the driven side in the CVT 11 as described above. Since the torque transmission direction becomes opposite to the direction in the low mode forward driving state, the axial force Fp of the primary pulley is balanced to maintain a state wherein it is larger than the axial force Fs of the secondary pulley. In this state (Fp>Fs), similar to that described above, when the axial force Fs on the secondary side exceeds that amount providing a state of equal axial forces (Fp=Fs), the CVT 11 is shifted toward underdrive and the transmission system 1 thereby moves toward overdrive, so that the transmission is returned to the neutral position where the speed of output shaft 5 is zero. Accordingly, the transmission system 1 is automatically returned to and stably held at the neutral position even if the CVT 11 is, for example, shifted to the overdrive side or the underdrive side.

Figure 10:
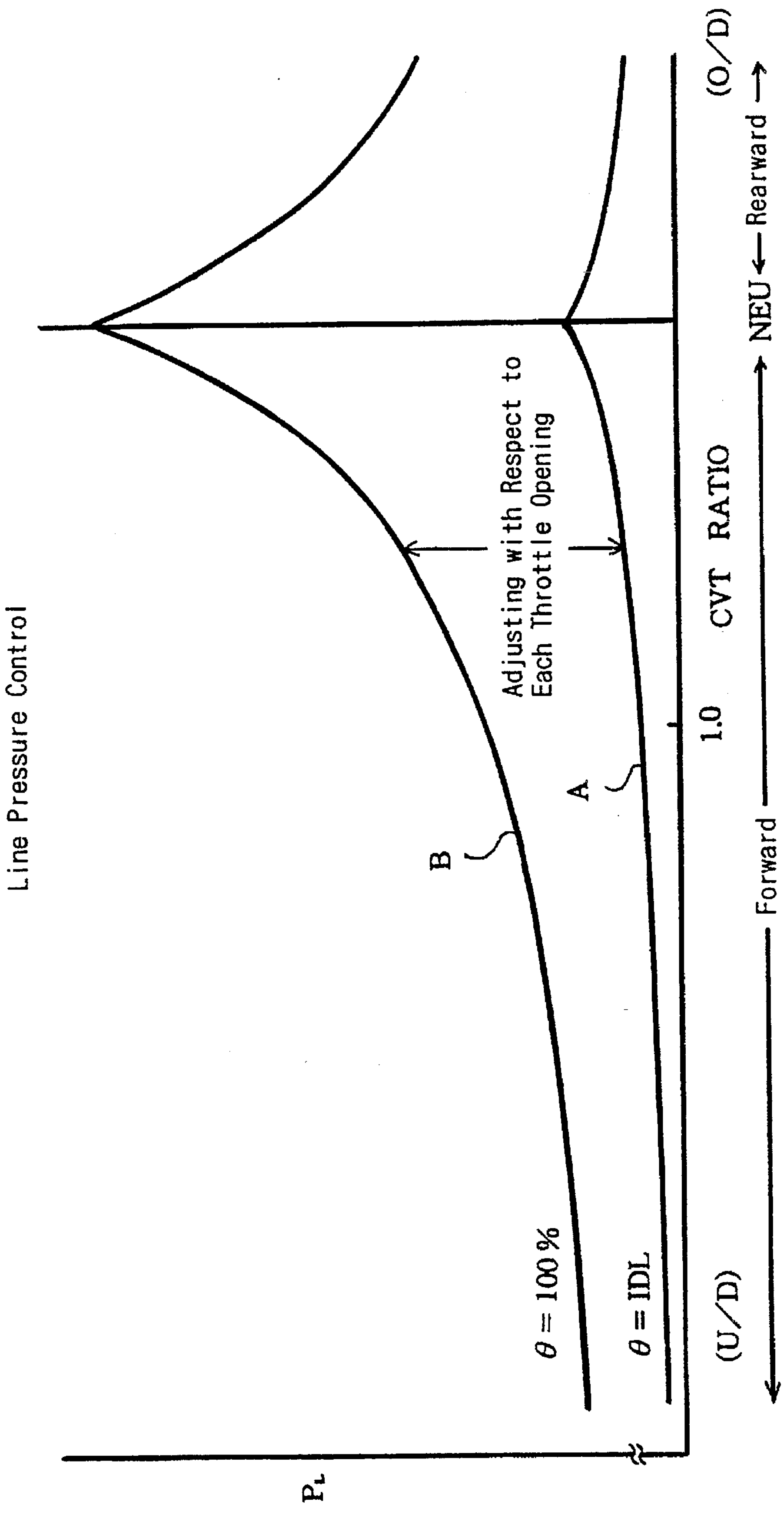
FIG. 10 is a graph of line pressure ($P_L$) versus torque ratio of CVT.

It is to be noted that FIG. 10 is a diagram showing control of a line pressure $P_L$ by the regulator valve 56, responsive to the throttle opening θ and the torque ratio of the CVT 11. That is, the line pressure $P_L$ is adjusted for the detected throttle opening, between a line pressure curve A in which the throttle opening is at the idle position and a line pressure curve B in which the throttle opening is 100%, the line pressure $P_L$ corresponding to the transmission torque capacity. With the neutral control described above, since the engine speed is at idle and the engine output becomes zero, neutral control can be implemented by a relatively small amount of hydraulic pressure without generating line pressure $P_L$ corresponding to the transmission torque capacity described above.

Although in the above description neutral control involves equalization of the axial force on the primary pulley 7 with that on the secondary pulley 9, a neutral control substantially the same as described above can be achieved with a difference between axial forces smaller than the difference between the axial forces on the two pulleys that would be determined by the input torque and the pulley ratio of the CVT 11 during positive or negative torque transmission, i.e. even if both axial forces Fp, Fs are not equal.

Figure 9A:
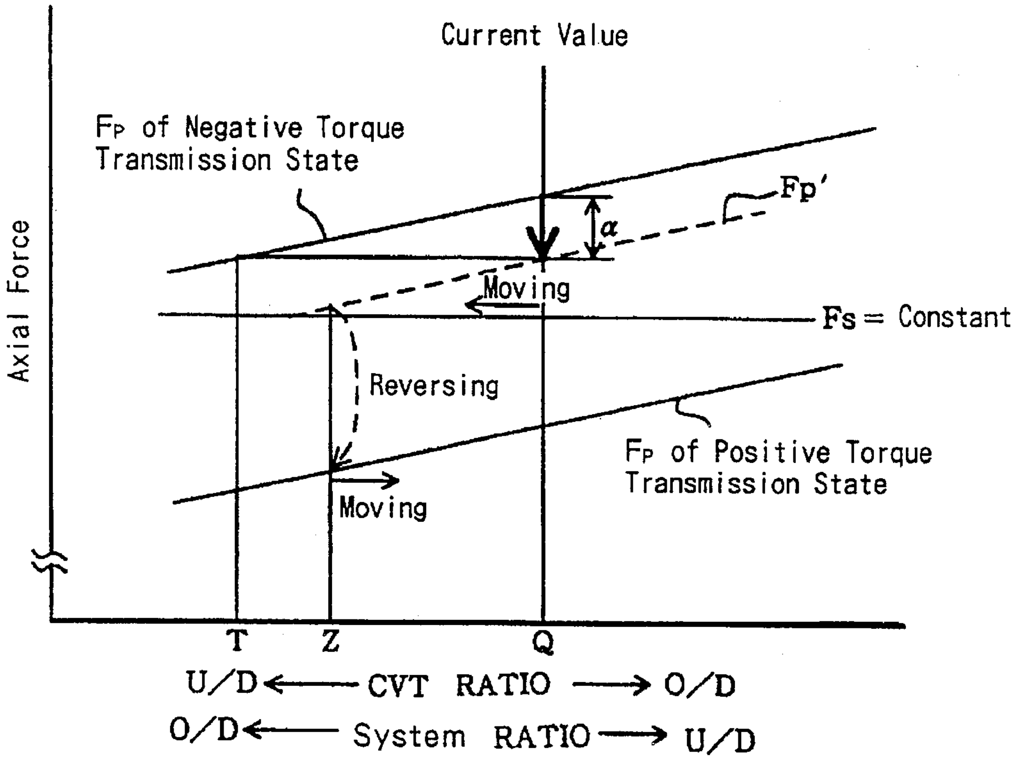
FIG. 9(*a*) is a graph of axial force versus CVT and system ratios, illustrating the axial force balance when secondary side axial force Fs is constant.
Figure 9B:
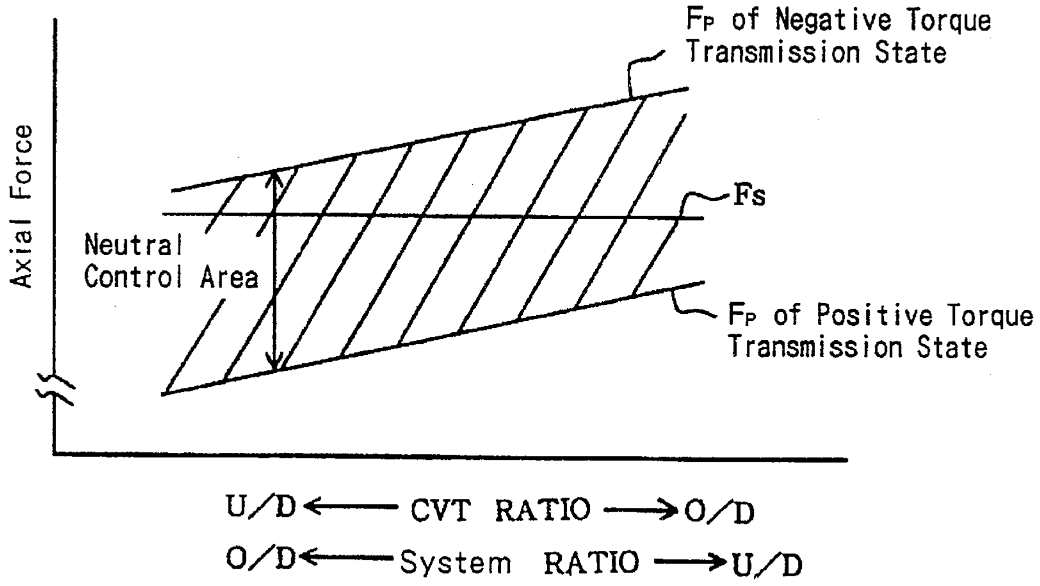

As shown in FIG. 9(*a*), assuming that the axial force Fs on the secondary pulley 9 is constant for ease of understanding, the axial force Fp of the primary pulley 7 is larger than the axial force Fs of the secondary pulley 9 (Fp>Fs) and the pulley ratio has the current value Q, because the neutral control is initiated from the coasting state (the negative torque transmission state) as described above. If the primary side axial force Fp is set to a smaller value (Fp'=Fp−α) by an amount α, the primary pulley 7 is widened (or the effective diameter is made smaller), the CVT 11 moves toward underdrive (U/D), and the transmission system 1 as a whole moves toward the overdrive (O/D).

Although if this state (Fp'=Fp−α) is maintained the CVT is balanced with speed-change value T and stably held at the target pulley ratio in a manner as effected in normal speed-changing (shift) control, and the CVT is further moved toward the underdrive (U/D) if the primary side axial force Fp' is at any time changed during a change in the pulley ratio, as shown by the broken line.

When the engine speed is lowered in changing the CVT 11 toward underdrive (and thereby changing the transmission system 1 toward overdrive) or due to a lowered vehicle speed, if the engine speed falls below the idling speed (Z position in FIG. 9(*a*)), the torque transmission direction is reversed and the transmission system 1 then enters into a state wherein the torque is transmitted from the engine to the drive wheels (positive torque transmission state). Though the axial force balance would be reversed (Fs>Fp) according to the reverse of the transmission torque (negative torque→positive torque), the primary side axial force Fp in fact comes to be the greater value since the primary side axial force is at Fp' at that time. Therefore, the primary pulley 7 has its width made narrower (the effective diameter becomes larger), so that the CVT 11 changes its speed toward overdrive (O/D) and the transmission system 1 changes its speed toward underdrive (U/D).

When the engine speed is increased to a level where the engine speed surpasses the vehicle speed or when the vehicle speed limits the engine speed, operation of the engine is changed to the negative torque transmission state (Fp>Fs), so that the CVT 11 changes its speed toward the underdrive as described above and the transmission system 1 changes its speed toward the overdrive. Repeating this control operation, the vehicle reduces its speed until it reaches a stop (neutral position) and is stably held in this stopped state.

The range for the variable amount $\alpha$ which adjusts the primary side axial force Fp can, as shown in FIG. 9(*b*), be anywhere between axial force Fp during positive torque transmission and axial force Fp during negative torque transmission, which are determined by the input torque and pulley ratio of the CVT (cross-hatched area), and therefore, Fp can be a constant axial force Fp' close to the secondary side axial force Fs within the practical range, or according to the change of the pulley ratio, the axial force Fp' (also possibly Fs') can always be controlled to be a value in the (cross-hatched) zone. That is, neutral control can be achieved even when the axial forces on both pulleys 7, 9 are not precisely identical due to the biasing force of the spring 55 for pre-loading therebetween in the embodiment in FIG. 4 (similar to an embodiment in FIG. 11 described below). The CVT automatically self-converges to the non-drive state, and even when the axial force Fp or Fs is controlled to be a value within a relatively broad range (cross-hatched zone) corresponding to the pulley ratio at that time, the neutral control is achieved.

Although the description above is limited to the case where the secondary side axial force is constant, for ease of understanding, the neutral control can similarly be conducted even under conditions wherein the axial force Fs is varied as shown in FIG. 8. When the neutral control starts with the current valve Q while the CVT 11 is operating with a stable pulley ratio at point Q in FIG. 8, the vehicle is coasting (with negative torque transmission) where the throttle opening is in the idle position as described above. If the primary side axial force Fp is set to be a smaller value Fp' ($Fp'=Fp-\alpha$) by $\alpha$, the lower force Fp' ($Fp'<Fp$), in a similar manner as described above, causes the CVT to move toward underdrive (U/D) and the transmission system 1 thereby changes its speed toward overdrive.

If this state is maintained, the CVT would be balanced at a pulley ratio T ($Fp/Fs=x'/y'=x/y$) at which the axial force ratios ($Fp'/Fs=x/y$) are identical, and the CVT is stably held at that pulley ratio. However, if the primary side axial force Fp' is changed at any time to correspond to the pulley ratio as shown by the broken line, the CVT further moves toward underdrive (U/D) direction.

The engine speed is lowered as the CVT moves toward underdrive or as the vehicle speed is reduced. If the engine speed becomes lower than the idling speed (Z position), the torque transmission direction is reversed as described above to a state wherein the torque is transmitted from the engine to the drive wheels (positive torque transmission). Then, though the axial force balance would be reversed ($Fs>Fp$) according to the reverse of the transmission torque, the primary side axial force Fp' in fact becomes the greater value since the primary side axial force is at Fp'. Therefore, the primary pulley 7 has its effective diameter made larger, so that the CVT changes its speed toward overdrive and the transmission system 1 changes its speed toward underdrive.

When the engine speed is again increased to enter the negative torque transmission state, with the primary side axial force $Fp'<Fp$ as described above, so that the CVT changes its speed toward the underdrive direction and the transmission system 1 changes its speed toward overdrive. Repeating this control operation reduces the vehicle speed until the vehicle reaches a stop (neutral position) and is stably held in the stop state.

As shown in FIG. 8, the variable amount $\alpha$ by which the primary side axial force Fp' is adjusted, with a pulley ratio Q, can be any amount within a range N1 of the primary side axial forces Fp-Fp during positive torque transmission and during negative torque transmission, which states are determined by the input torque and pulley ratio of the CVT. When the pulley ratio is Z, $\alpha$ can be any amount within a range N2 for the primary side axial forces during either positive or negative torque transmission, which state is determined by the input torque and pulley ratio of the CVT. Although those ranges may vary in accordance with the pulley ratio, the ranges always maintain a certain span, so that frequent control operations are not needed.

A balance of axial forces is shown in FIG. 8 as an overlap of the positive torque transmission state and the negative torque transmission state. Therefore, when the torque transmission direction is reversed, the axial forces Fp, Fs do not substantially move vertically apart as shown in the diagram. The secondary side axial force Fs only is changed when the primary side axial force Fp is constant as indicated by a pulley ratio value Q, or the primary side axial force Fp only is changed if the secondary side axial force Fs is constant as indicated by a pulley ratio value Z. Furthermore, although the points Q and P have been selected for purposes of illustration, control as described above can be conducted at any pulley ratio value, so that there is no large movement from point Q to point Z in neutral control, rather, the transition occurs in small increments by continuously repeating the control operation until the vehicle stops.

That is, the neutral control (the non-drive state) is conducted with a smaller value, within a range not reversing the relationship in size, (or difference) between the axial forces Fp, Fs of the primary and secondary pulleys, than the difference between the axial forces on the primary and secondary pulleys that would be determined by the input torque and the pulley ratio of the belt type continuously variable transmission at that time if the output torque direction of the transmission system 1 was positive. Alternatively, that smaller value may be within a range where the relationship in size does not reverse, and a smaller value than the difference between the axial forces on the primary and secondary pulleys that would be determined by the input torque and the pulley ratio of the belt type continuously variable transmission at that time if the output torque direction was negative. Thus, as in the embodiment described above, although equalization of axial forces Fp, Fs is preferred since it makes control easier, neutral control with self-converging at the neutral position is implemented without disturbance even if both axial forces are not precisely identical or even if the axial forces are slightly different due to the biasing force of the pre-loading spring or the like, so that the neutral control can be implemented with control corresponding to the pulley ratio over a relatively broad range of axial force difference.

Figure 11:
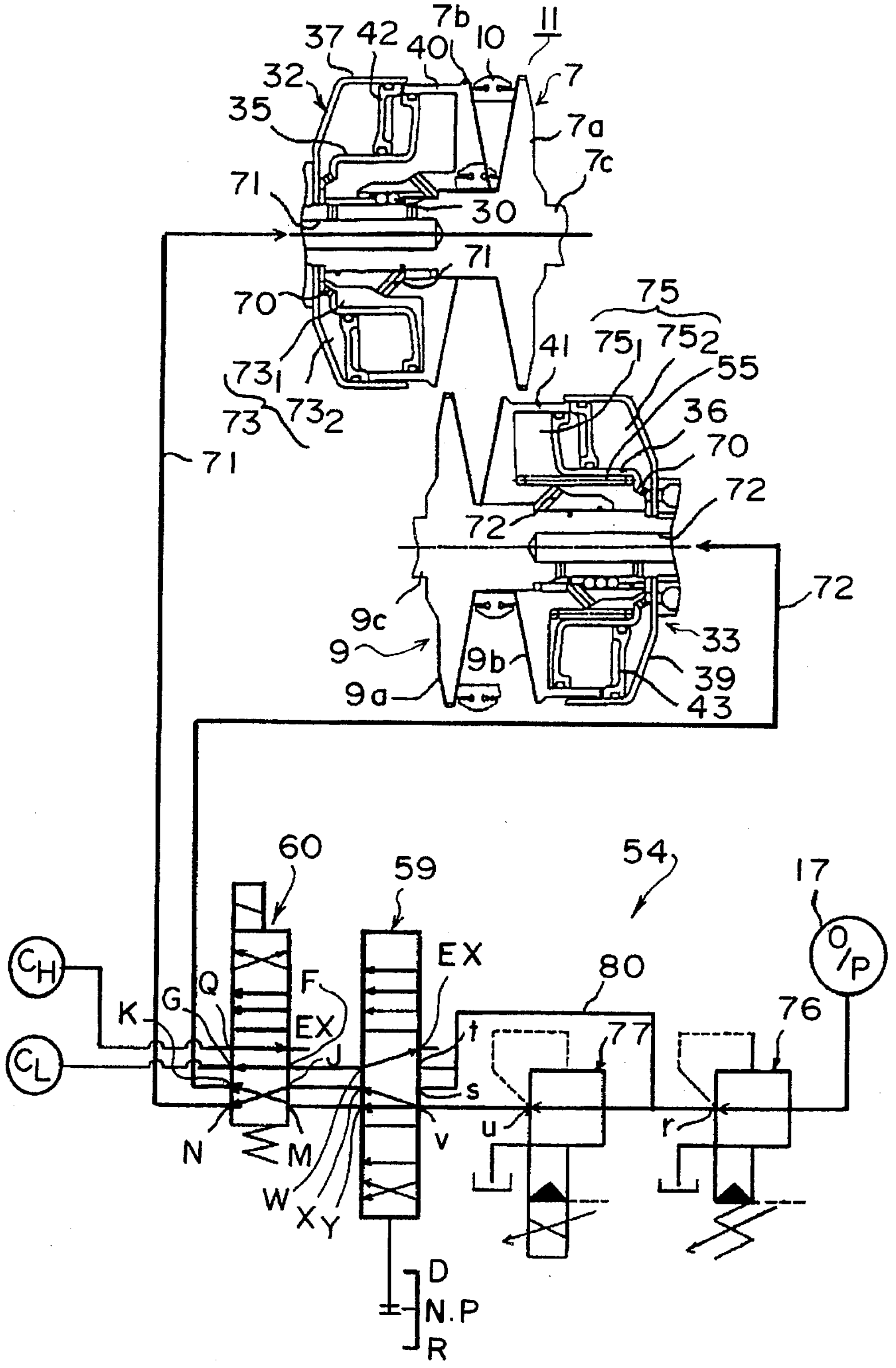
FIG. 11 is a hydraulic circuit diagram showing a second embodiment of a hydraulic control system for the CVT according to the invention.

Now referring to FIG. 11, another embodiment of a hydraulic control system is described. The primary and secondary side hydraulic servos 32, 33 of this embodiment, like the embodiment shown in FIG. 4, include first and secondary hydraulic chambers $\mathbf{73_1}$, $\mathbf{75_1}$, $\mathbf{73_2}$, $\mathbf{75_2}$. However, in this embodiment, holes 70, 70 are formed in the diaphragms 35, 36 to provide stepped or incremented pressure receiving areas. Thus, each of hydraulic chambers 73, 75 serves substantially as a single chamber (subdivided into first and second subchambers or pressure receiving areas) to which hydraulic pressure is supplied from hydraulic passages 71, 72. The hydraulic chambers 73, 75 have the same pressure receiving areas. The spring 55 for pre-loading is under compression and is located in the primary hydraulic chamber 75 of the secondary side hydraulic servo 33. The control unit 54 includes a primary regulator valve 76 and a secondary regulator valve 77 connected in series with the oil pump 17 and also includes the manual valve 59 and the low and high control valve 60.

The control unit 54 operates as shown in the operation table of FIG. 12. That is, in the low mode (L) of the D range, a relatively high line pressure ($P_L$–H), adjusted by the primary regulator valve 76, is in communication with ports s, t of the manual valve 59 through a hydraulic passage 80 of the output port r. The secondary regulator valve 77, generating a relative low line pressure ($P_L$–L) by adjusting the regulated pressure received from the primary regulator valve 76, communicates a port v of the manual valve 59 with an output port u thereof.

In the D range, the manual valve 59 is positioned to provide communication of port t with a port w, the port s with a port y, and the port v with a port x. In the low mode, the low and high control valve 60 is positioned to provide communication of a port F with a port G, a port J with a port N, and a port M with a port K, respectively. Therefore, the relatively high line pressure ($P_L$–H) of the primary regulator valve 76 is supplied to the hydraulic servo $C_L$ for the low clutch through the ports t, w of the manual valve 59 and the ports F, G of the low and high control valve 60 and operates on the hydraulic chamber 75 of the secondary side hydraulic servo 33 through ports s, y of the manual valve, ports M, K of the low and high control valve 60, and the hydraulic passage 72. On the other hand, the relatively low line pressure ($P_L$–L) of the secondary regulator valve 77 is supplied to the hydraulic chamber 73 of the primary side hydraulic servo 32 through ports v, x of the manual valve, ports J, N of the low and high control valve 60, and the hydraulic passage 71. Accordingly, the low clutch $C_L$ is engaged, and the relatively high axial force is exerted on the secondary pulley 9 while the relatively low axial force is exerted on the primary pulley 7, so that the CVT 11 enters the low mode drive state in which torque is transmitted from the secondary pulley 9 to the primary pulley 7.

During the high mode (H) of the D range, although the manual valve 59 takes the same position, the low and high control valve 60 is switched to provide communication of the port F with the port Q, the port J with the port K, and the port M with the port N. With valve 60 so positioned, the relatively high line pressure ($P_L$–H) from the primary regulator valve 76 is supplied to the hydraulic servo $C_H$ for the high clutch through the ports t, w of the manual valve 59 and the ports F, Q of the low and high control valve 60 and supplied to the hydraulic chamber 73 of the primary side hydraulic servo 32 through ports s, y of the manual valve, ports M, N of the low and high control valve 60, and the hydraulic passage 71. On the other hand, the relatively low line pressure ($P_L$–L) from the secondary regulator valve 77 is supplied to the hydraulic chamber 75 of the secondary side hydraulic servo 33 through the ports v, x of the manual valve 59, the ports J, K of the low and high control valve 60, and the hydraulic passage 72. Accordingly, the high clutch $C_H$ is engaged, the relatively high axial force is applied to the primary pulley 7 while the relatively low axial force is applied to the secondary pulley 9, so that the CVT 11 enters the high mode drive state in which the torque is transmitted from the primary pulley 7 to the secondary pulley 9.

If the manual valve 59 is moved to the reverse range (R), the valve 59 is switched to provide communication of the port t with the port w, the port s with the port x, and the port v with the port y, and at the same time, the low and high control valve 60 is switched to its low mode position. In this situation, the relatively high line pressure ($P_L$–H) from the primary regulator valve 76 is supplied to the hydraulic servo $C_L$ for the low clutch through the ports t, w of the manual valve 59 and the ports F, G of the low and high control valve 60 and to the hydraulic chamber 73 of the primary side hydraulic servo 32 through the ports s, x of the manual valve, the ports J, N of the low and high control valve 60, and the hydraulic passage 71. On the other hand, the relatively low line pressure ($P_L$–L) from the secondary regulator valve 77 is supplied to the hydraulic chamber 75 of the secondary side hydraulic servo 33 through the ports v, y of the manual valve 59, the ports M, K of the low and high control valve 60, and the hydraulic passage 72. Accordingly, the low clutch $C_L$ is engaged, and the relatively high axial force is applied to the primary pulley 7 while the relatively low axial force is applied to the secondary pulley 9, so that the CVT 11 enters the reverse state in which the torque is transmitted from the primary side to the secondary side. It is to be noted that, as shown in FIG. 12, when the manual valve is moved to the park position (P) or the neutral position (N), the relatively low line pressure ($P_L$–L) operates on the primary and secondary side hydraulic servos 32, 33.

Figure 13:
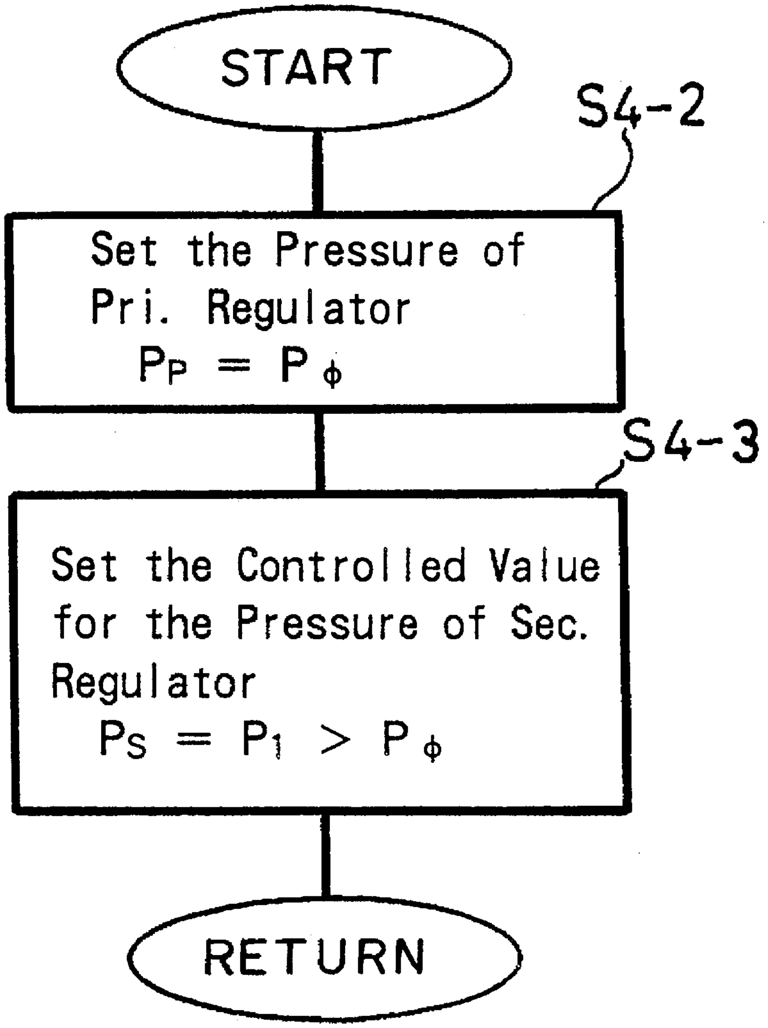
FIG. 13 is a flowchart of a neutral control subroutine utilized by the control mechanism shown in FIG. 11.

Neutral control is executed, as shown at step S4 in FIG. 6, when the vehicle speed is at or below the preset speed (V<V0) and when the throttle opening is at idle (θ=Idle). In this embodiment, as shown in FIG. 13, the regulated pressure output Pp of the primary regulator valve 76 is set at the lowest pressure Pø (S4-2) and the regulated pressure output Ps of the secondary regulator valve 77 is set at an adjusted pressure P1 which is higher than the lowest pressure Pø (S4-3). Since the secondary regulator valve 77 receives as input the output pressure of the primary regulator valve 76, if the output of the solenoid valve for controlling the secondary valve is set so that the output Ps of the secondary valve 77 becomes higher than the output pressure Pø of the primary valve 76, only the output pressure Pø passes through the secondary valve 77 without changing into a Ps which is smaller than Pø, and the secondary valve 77 substantially does not work. Therefore, the output pressure Ps of the secondary valve becomes the same as the output pressure Pp of the primary valve. (Pp=Ps)

During the neutral control state, which is the same situation as the low mode (L) in which the manual valve 59 is in the D range and the low and high control valve 60 is in its low mode position, the output pressure (Pp=Pα) of the primary regulator valve 76 is supplied to the hydraulic servo $C_L$ for the low clutch through the ports t, w of the manual valve 59 and the ports F, G of the low and high control valve 60 and to the hydraulic chamber 75 of the secondary side hydraulic servo 33 through the ports s, y of the manual valve 59, the ports M, K of the low and high control valve 60, and the hydraulic passage 72. On the other hand, the hydraulic pressure (Ps=Pp=Pø) from the output port u of the secondary regulator valve 77 is supplied to the hydraulic chamber 73 of the primary side hydraulic servo 32 through the ports v, x of the manual valve 59, the ports J, N of the low and high control valve 60, and the hydraulic passage 71.

Accordingly, during the low mode state (L) in which the low clutch $C_L$ is engaged, equal axial forces are exerted on the primary pulley 7 and the secondary pulley 9, and as described above, the CVT 11 automatically self-converges so that the output of the transmission system 1 at the output shaft 5 becomes zero, as the vehicle speed decreases and is stably held at the neutral position in which the output speed is zero.

Referring to FIGS. 14 to 20, other embodiments of the power transmission mechanism in the continuously variable transmission are described. FIG. 14 is a modification in which the primary shaft 7*c* is offset from (not axially aligned with) the first shaft (input shaft 3) and the engine crankshaft 2 and in which the low clutch $C_L$ is disposed on the second shaft 5 in addition to the high clutch $C_H$. Accordingly, the rotation of the engine crankshaft 2 is transmitted to the input shaft 3 through the damper 12, transmitted to the primary pulley 7 through gears 86, 87, and transmitted to the carrier 19*c* of the planetary gear unit 19 of the low clutch $C_L$ through gears 86, 89. In the single pinion planetary gear unit 19, the first rotary element coupled to the input shaft 3 is the carrier 19*c*; the second rotary element coupled to the secondary pulley 9 is the sun gear 19*s*; and the third rotary element coupled to the output shaft 5 is the ring gear 19*r*. The carrier 19*c* and the sun gear 19*s* rotate in the same direction. It is to be noted that the oil pump 17 is arranged on the primary shaft 7*c* at the engine side.

The power transmission mechanism of the embodiment operates in substantially the same way as the embodiment described with reference to FIG. 1, as shown in the speed diagram of FIG. 14(*b*). That is, in the low mode (Lo) in which the low clutch $C_L$ is engaged, the engine torque is transmitted to the carrier 19*c* of the planetary gear unit 19 through the low clutch $C_L$, transmitted to the sun gear 19*s* through the CVT 11, and taken out at the output shaft 5 through the ring gear 19*r* with torque circulation. The rotation of the output shaft 5 is switched between the forward and reverse directions through the neutral position therebetween. In the high mode, the engine torque is transmitted to the output shaft 5 through the CVT 11 and the high clutch $C_H$.

FIG. 15 shows an embodiment using a dual pinion planetary gear unit 19, in which: the ring gear 19*r* of the planetary gear unit 19 (first rotary element) is coupled to the input shaft 3 through gears 90, 91 and the low clutch $C_L$; the sun gear 19*s* (the second rotary element) is coupled to the secondary pulley 9 through gears 92, 93; the carrier 19*c* (the third rotary element) is coupled to the output shaft 5; and the ring gear 19*r* and the sun gear 19*s* are connectable with each other through the high clutch $C_H$. The ring gear 19*r* and the sun gear 19*s* rotate in the same direction. It is to be noted that the third rotary element can be the sun gear instead of the carrier and that the first and second rotary elements can be a carrier (not serving as the third rotary element), the sun gear or the ring gear.

In this embodiment, as shown in the speed diagram in FIG. 15(*b*), in the low mode (Lo), the engine torque from the input shaft 3 is transmitted to the ring gear 19*r* of the planetary gear unit 19 through the low clutch $C_L$ and the gears 91, 90 and is transmitted to the sun gear 19*s* through the CVT 11 and the gears 93, 92. Torque circulation is established in the same way as in the above embodiment, and in the CVT 11 the secondary pulley 9 becomes the driving side while the primary pulley 7 becomes the driven side for output of the torque from the carrier 19*c* to the output shaft 5 in overdrive and in underdrive, opposite in direction to the overdrive/underdrive direction of the CVT. Furthermore, if the CVT 11 enters the overdrive (O/D) state, the carrier 19*c* reverses its direction of rotation, and reverses the torque transmission direction of the CVT 11. During the high (Hi) mode, the engine torque from the input shaft 5 is transmitted to a shaft 95 through the CVT 11, and the gears 93, 92, and the torque of the shaft 95, at the speed established within the CVT, is transmitted as is to the output shaft 5 because in the high mode the planetary gear unit 19 is in a unitary rotation state due to engagement of the high clutch $C_H$.

FIG. 16 is an embodiment in which the power transmission unit 26 of the embodiment shown in FIG. 1 is modified. That is, the carrier 19*c* of the planetary gear unit 19 (first rotary element) is coupled to the input shaft 3 through the gears 90, 91 and the low clutch $C_L$; the sun gear 19*s* (the second rotary element) is coupled to the secondary pulley 9 through the gears 92, 93; and the ring gear 19*r* (the third rotary element) is coupled to the output shaft 5. The carrier 19*c* and the sun gear 19*s* rotate in the same direction. The high clutch $C_H$ is placed between a secondary pulley co-operation shaft 95 and the output shaft 5 of the transmission system 1.

In this embodiment, as shown in the speed diagram of FIG. 16(*b*), in the low mode, the engine torque from the input shaft 3 is transmitted to the carrier 19*c* of the planetary gear unit 19 through the low clutch $C_L$ and the gears 91, 90 and is transmitted to the sun gear 19*s* through the CVT 11 and the gears 93, 92, and the rotations of both gears are integrated and output from the ring gear 19*r* to the output shaft 5. Torque circulation is established in the same way as in the above embodiment at that time and output at the output shaft 5 is zero at the predetermined overdrive position of the CVT 11. Change from the predetermined position further into overdrive allows output of reverse rotation. During the high mode, the torque from the input shaft 3 is varied in speed as desired through the CVT 11 and taken out at the output shaft 5 through the gears 93, 92 and the high clutch $C_H$.

FIG. 17 is an embodiment which represents a modification of the embodiment in FIG. 16. In the embodiment of FIG. 17 the sun gear 19*s* of a single pinion planetary gear unit 19 (first rotary element) is coupled to the input shaft 3 through the gears 90, 91 and the low clutch $C_L$; the carrier 19*c* (the second rotary element) is coupled to the secondary pulley 9 through the gears 92, 93; and the ring gear 19*r* (the third rotary element) is coupled to the differential device 25 through the output shaft 5 and the gears 21, 24. The sun gear 19 and the carrier 19*c* rotate in the same direction. No high mode is used and the high clutch is omitted, because the variable speed of the CVT 11 is amplified within the planetary gear unit 19.

In this embodiment, as shown in the speed diagram of FIG. 17(*b*), the engine torque from the input shaft 3 is transmitted to the sun gear 19*s* of the planetary gear unit 19 through the low clutch $C_L$ and the gears 91, 90, subject to the CVT 11 speed change which is transmitted to the carrier 19*c* through the gears 93, 92, and output at the output shaft 5, after the speed change rotation from the carrier 19*c* is amplified. A torque circulation loop is established in the same way as in the above embodiment at that time, and the torque transmission direction of the CVT 11 is changed while the output shaft 5 has a relatively wide range of output in the forward direction, in the neutral position at which rotational speed is zero, and in the zone of reverse rotation.

FIG. 18 is another modification based on the embodiment in FIG. 16. In the embodiment of FIG. 18, the carrier 19*c* of a planetary gear unit 19 (first rotary element) is coupled to the input shaft 3 through the gears 90, 91 and the low clutch $C_L$; the ring gear 19*r* (the second rotary element) is coupled to the secondary pulley 9 through the gears 92, 93; and the sun gear 19*s* (the third rotary element) is coupled to the output shaft 5. The carrier 19*c* and the ring gear 19*r* rotate in the same direction. The high clutch $C_H$ is placed between the secondary pulley co-operation shaft 95 and the output shaft 5.

In this embodiment, as shown in the speed diagram of FIG. 18(*b*), in the low mode, the engine torque from the input shaft 3 is transmitted to the carrier 19c of the planetary gear unit 19 through the low clutch $C_L$ and the gears 91, 90, and is transmitted to the ring gear 19r through the CVT 11 and the gears 93, 92, and these rotations input through the carrier 19c and the ring gear 19r are integrated and output from the sun gear 19s to the output shaft 5. A torque circulation loop is established in the same way as in the above embodiment at that time. The output shaft 5 rotation may be changed between forward and reverse. The torque is amplified by speed change within the CVT 11 and is output from the output shaft 5. During the high mode, the rotational input from the input shaft 3 is varied in speed through the CVT 11 and taken out at the output shaft 5 through the gears 93, 92 and the high clutch $C_H$.

FIG. 19 shows an embodiment which is a modification of the embodiment of FIG. 17. In the embodiment of FIG. 19, the sun gear 19s of a single pinion planetary gear unit 19 (first rotary element) is coupled to the input shaft 3 through a chain 22 and the low clutch $C_L$; the ring gear 19r (the second rotary element) is coupled to the secondary pulley 9 through the gears 92, 93; and the carrier 19c (the third rotary element) is coupled to the differential device 25 through the output shaft 5 and the gears 21, 24. The sun gear 19 and the ring gear 19r rotate in opposite directions. It is to be noted that the first rotary element can be a ring gear and the second rotary element can be a sun gear.

In this embodiment, as shown in the speed diagram of FIG. 19(*b*), the engine rotation from the input shaft 3 is transmitted to the sun gear 19s of the planetary gear unit 19 through the low clutch $C_L$ and the chain 22 and is transmitted to the ring gear 19r through the CVT 11 and the gears 93, 92, and both the rotation input through the sun gear 19s and that input through the ring gear 19r are integrated and this combined rotation is output at the output shaft 5 by way of the carrier 19c. A torque circulation loop is similarly established at that time. Again, the rotation output from the output shaft 5 may be changed between forward and reverse.

The embodiment depicted in FIG. 20 is a modification based on the embodiment of FIG. 19 using a dual pinion planetary gear unit. That is, the sun gear 19s of the dual pinion planetary gear unit 19 (first rotary element) is coupled to the input shaft 3 through the chain 22 and the low clutch $C_L$; the carrier 19c (the second rotary element) is coupled to the secondary pulley 9 through the gears 92, 93; and the ring gear 19r (the third rotary element) is coupled to the differential device 25 through the output shaft 5 and the gears 21, 24. The sun gear 19 and the ring gear 19r rotate in opposite directions. It is to be noted that the first rotary element can be a carrier and the second rotary element can be a sun gear.

In this embodiment, as shown in the speed diagram of FIG. 20(*b*), the engine rotation from the input shaft 3 is transmitted to the sun gear 19s of the dual planetary gear unit 19 through the low clutch $C_L$ and the chain 22, and is also transmitted to the carrier 19c through the CVT 11 and the gears 93, 92, and the outputs of both of these torque paths are integrated and output at the output shaft 5 by way of the ring gear 19r. A torque circulation loop is similarly established at that time. The rotation of the output shaft 5 may be changed between forward and reverse.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A continuously variable transmission system for speed change of rotation received from an engine output shaft and for transmitting that rotation, at the changed speed, to vehicle wheels, said system comprising:

- an input shaft for receiving engine torque from the engine output shaft;
- an output shaft for outputting torque to the vehicle wheels;
- a belt type continuously variable transmission unit having a first pulley for receiving engine torque from said input shaft, a second pulley, and a belt trained around both of said first and second pulleys;
- a planetary gear unit having a first rotatable element rotatable with said input shaft, a second rotary element rotatable with said second pulley and a third rotary element rotatable with said output shaft;
- axial force operating means for applying axial forces to both pulleys to change the pulley ratio between said primary and secondary pulleys, direction of torque transfer between the pulleys and the direction of torque at said output shaft being changed in accordance with said change of the pulley ratio;
- detecting means for detecting vehicle driving demand and for generating a demand signal;
- judging means for determining a need for output torque at said output shaft in accordance with said demand signal;
- control means for switching, based on the determination of said judging means, said axial force operating means between a drive state, wherein a difference between said axial forces is established to achieve a target pulley ratio, and a non-drive state not requiring the output torque, wherein the axial forces exerted on the primary and secondary pulleys are equalized.

2. A continuously variable transmission system for speed change of rotation received from an engine output shaft and for transmitting that rotation, at the changed speed, to vehicle wheels, said system comprising:

- an input shaft for receiving engine torque from the engine output shaft;
- an output shaft for outputting torque to the vehicle wheels;
- a belt type continuously variable transmission unit having a first pulley for receiving engine torque from said input shaft, a second pulley, and a belt trained around both of said first and second pulleys;
- a planetary gear unit having a first rotatable element rotatable with said input shaft, a second rotary element rotatable with said second pulley and a third rotary element rotatable with said output shaft;
- axial force operating means for applying axial forces to both pulleys to change the pulley ratio between said primary and secondary pulleys, direction of torque transfer between the pulleys and the direction of torque at said output shaft being changed in accordance with said change of the pulley ratio;
- detecting means for detecting vehicle driving demand and for generating a demand signal;
- judging means for determining a need for output torque at said output shaft in accordance with said demand signal;

control means for switching, based on the determination of said judging means, said axial force operating means between a drive state, wherein a difference between said axial forces is established to achieve a target pulley ratio, and a non-drive state not requiring the output torque, wherein the axial forces exerted on the primary and secondary pulleys are equalized;

wherein any difference between the axial forces on said primary and secondary pulleys is maintained at a small value within a range not reversing relative amounts of the axial forces on said primary and secondary pulleys, with said small value being smaller than the difference between the axial forces on said primary and secondary pulleys determined by the input torque and the pulley ratio of said belt type continuously variable transmission at that time when the output torque direction of said output shaft is positive or at a small value within a range not reversing relative amounts of the axial forces on said primary and secondary pulleys, with said small value being smaller than the difference between the axial forces on said primary and secondary pulleys determined by the input torque and the pulley ratio of said belt type continuously variable transmission at that time when the output torque direction of said output shaft is negative.

3. The continuously variable transmission according to claim 1 or 2, wherein:

said axial force operating means includes a primary hydraulic servo for changing the effective diameter of said primary pulley and a secondary hydraulic servo for changing the effective diameter of said secondary pulley;

each of said primary and secondary hydraulic servos includes a plurality of hydraulic chambers; and said control means changes effective pressure receiving areas of said primary and secondary hydraulic servos by selectively switching hydraulic passages to said respective hydraulic chambers to make the effective pressure receiving areas of both hydraulic servos different during the drive state and equal during the non-drive state.

4. The continuously variable transmission according to claim 3, wherein:

each of said primary and secondary hydraulic servos includes at least a primary hydraulic chamber and a secondary hydraulic chamber;

said primary hydraulic chambers of both hydraulic servos have the same effective pressure receiving area;

said control means includes a regulator valve for supplying a first hydraulic pressure to said primary hydraulic chambers of both said first and said second hydraulic servos and a ratio control valve for supplying a second hydraulic pressure to one of said secondary hydraulic chambers during the drive state and for discharging said second hydraulic pressure from said one secondary hydraulic chamber to establish the non-drive state.

5. The continuously variable transmission according to claim 1 or 2 wherein:

said axial force operating means includes a primary hydraulic servo for changing the effective diameter of said primary pulley and a secondary hydraulic servo for changing the effective diameter of said secondary pulley;

said primary and secondary hydraulic servos include respective hydraulic chambers having the same pressure receiving area;

said controlling means includes a primary regulator valve for, during the drive state, supplying primary hydraulic pressure to one of said hydraulic chambers and a secondary regulator valve for, during the drive state, supplying a secondary hydraulic pressure to the other of said hydraulic chambers; and during the non-drive state, hydraulic pressure is supplied to said hydraulic chambers of both of said hydraulic servos from either one of said primary and secondary regulator valves.

6. The continuously variable transmission according to claim 5, wherein said primary regulator valve is in hydraulic communication with said secondary regulator valve so that the primary hydraulic pressure from said primary regulator valve is input to said secondary regulator valve and, during the non-drive state, the secondary hydraulic pressure output by said secondary regulator valve is set higher than said primary hydraulic pressure.

7. The continuously variable transmission according to claim 1 or 2, wherein:

said detecting means includes a vehicle speed sensor for detecting vehicle speed and a throttle sensor for detecting throttle opening of the engine; and said judging means determines that the output torque is not required, when the vehicle speed is at or below a predetermined amount and when the throttle opening is at or below a predetermined amount.

8. The continuously variable transmission according to claim 1 or 2, further comprising switching means for switching between a low speed mode wherein said first rotary element, said second rotary element, and said third rotary element in said planetary gear unit are rotatable with said input shaft, said secondary pulley, and said output shaft, respectively, and a high speed mode wherein direct transmission of torque between said first rotary element and said input shaft is cut off and said secondary pulley is coupled to said output shaft for rotation therewith.

9. The continuously variable transmission according to claim 1 or 2, wherein said input shaft is coupled to said primary pulley and said first element, respectively, so that the torque direction at said input shaft and the torque transmitted from said primary pulley are the reverse of the torque direction at said input shaft when said input shaft is driven by torque transmitted from said first element during the drive state.

10. The continuously variable transmission according to claim 1 or 2, wherein direction of rotation of said output shaft is changed between forward and reverse directions through a neutral position where rotational speed of said output shaft becomes zero by changing the pulley ratio of said belt type continuously variable transmission.

11. The continuously variable transmission according to claim 8, wherein when said switching means switches to said low speed mode, said output shaft is changed sequentially between reverse rotation, zero rotation and forward rotational overdrive by changing the pulley ratio of said belt type continuously variable transmission toward an underdrive direction and, when said switching means switches to said high speed mode, said output shaft is changed in the forward rotational overdrive direction by changing the pulley ratio of said belt type continuously variable transmission toward an overdrive direction.

12. The continuously variable transmission according to claim 1 or 2, wherein:

said planetary gear unit is a single pinion planetary gear unit including a sun gear, a ring gear and a carrier;

said third rotary element is either the sun gear or the ring gear; and said first and second rotary elements are the other of the sun gear, the ring gear and the carrier and rotate in the same direction.

13. The continuously variable transmission according to claim 1 or 2, wherein:

said planetary gear unit is a dual pinion planetary gear unit including a sun gear, a carrier and a ring gear;

said third rotary element is either the sun gear or the carrier; and said first and second rotary elements are the other of the sun gear, the carrier and the ring gear and rotate in the same direction.

14. The continuously variable transmission according to claim 1 or 2, wherein:

said planetary gear unit is a single pinion planetary gear unit including a sun gear, a carrier and a ring gear;

said third rotary element is the carrier; and said first and second rotary elements are the sun gear and the ring gear and rotate opposite in direction to each other.

15. The continuously variable transmission according to claim 1 or 2, wherein:

said planetary gear unit is a dual pinion planetary gear unit including a sun gear, a carrier and a ring gear;

said third rotary element is the ring gear; and said first and second rotary elements are the sun gear and the carrier and rotate opposite in direction to each other.

* * * * *